(12) United States Patent
Lebreux et al.

(10) Patent No.: US 6,857,918 B1
(45) Date of Patent: Feb. 22, 2005

(54) PERSONAL WATERCRAFT HAVING A HYBRID POWER SOURCE

(75) Inventors: Normand Lebreux, Élie d'Orford (CA); Rénald Plante, Rock-Forest (CA); Yves Berthiaume, Mont St-Hilaire (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 10/400,909

(22) Filed: Mar. 28, 2003

Related U.S. Application Data

(60) Provisional application No. 60/367,715, filed on Mar. 28, 2002.

(51) Int. Cl.$^7$ .................................................. B60L 11/02
(52) U.S. Cl. ............................................. 440/6; 440/84
(58) Field of Search ....................................... 440/84, 6

(56) References Cited

U.S. PATENT DOCUMENTS

| | | | | |
|---|---|---|---|---|
| 5,083,948 A | * | 1/1992 | Grobson | 440/49 |
| 6,098,735 A | * | 8/2000 | Sadarangani et al. | 180/65.2 |
| 2002/0153745 A1 | * | 10/2002 | Messano | 296/156 |

OTHER PUBLICATIONS

Popular Science article entitled "High Bred Hybrids," Mar., 2001, pp. 77–79.
Aei Articled entitled "Siemens Starter/Generator for 2002," Jan. 2001, p. 56.
Siemens Press Release entitled "Siemens Integrated Starter Generator Stands Ready to Meet SUV Makers Aggressive Fuel Economy Targets," Oct. 15, 2000.

* cited by examiner

*Primary Examiner*—Stephen Avila
(74) *Attorney, Agent, or Firm*—BRP Legal Services

(57) ABSTRACT

A hybrid fuel/electric powered watercraft includes an electronic turning machine (ETM), and internal combustion engine, and a propulsion system, which are operatively connected to each other, preferably via one or more clutches. An electronic control unit (ECU) controls the ETM, clutch (es), and engine. At low speeds, the ECU disengages at least one clutch and solely uses the ETM to power the propulsion unit and propel the watercraft. At high speeds, the ECU engages the clutch and uses both the engine and the ETM or just the engine to power the propulsion system. When the watercraft's battery discharges, the ECU operates the ETM in a generator mode and runs the engine to charge the battery. The watercraft can also include a shore button feature that selectively limits/governs the speed of the watercraft. A clutch may be used to avoid driving the propulsion system when the engine is idling or being started.

20 Claims, 14 Drawing Sheets

PERSONAL WATERCRAFT HAVING A HYBRID POWER SOURCE

CROSS-REFERENCE

This application claims the benefit of priority to U.S. Provisional Patent Application No. 60/367,715 titled "HYBRID PERSONAL WATERCRAFT," filed on Mar. 28, 2002, which is incorporated herein by reference.

BACKGROUND OF THE INVENTION

1. Field of the Invention

This invention relates to watercraft, especially jet-powered personal watercraft ("PWC"). More specifically, the invention concerns power sources used in watercraft, such as PWCs.

2. Description of Related Art

Jet powered watercraft have become very popular in recent years for recreational use and for use as transportation in coastal communities. The jet, power offers high performance, which improves acceleration, handling and shallow water operation. Accordingly, jet-powered PWCs and sport boats have become common place, especially in resort areas.

PWCs are typically powered by a two or four stroke internal combustion engine (ICE) that has a drive shaft operatively connected to the jet pump. While such engines provide ample power for PWCs, they create both environmental and noise pollution. Furthermore, the idle speed of a conventional ICE is generally well above 1000 rpm. Unfortunately, when PWCs are operated at low speeds such as during trolling or operating in and around people, obstacles, docks, etc., it is preferred to have an engine speed (and proportionally corresponding PWC speed) of less than 1000 rpm. The precise locations in which riders use PWCS at low speeds (i.e., around docks, people, shore, etc.) are also the locations where preventing noise and environmental pollution is most important. Farther away from docks, people, and shore, riders tend to drive PWCs faster and increased power is highly desirable.

During an internal combustion engine's slow start routine, the majority of hydrocarbons are emitted. It would be desirable, therefore, to provide additional power to the power train until the engine is fully engaged. One way to provide additional power is to use stored electrical energy. However, conventional electrical systems are 12–14V (volt), which have a low limit of how much total vehicle power and amount can be supplied, particularly in view of current standard electrical peripherals. Such 12–14 V systems also require bulky wiring harnesses and electronics that experience voltage sags and spikes.

One way this problem has been addressed is to update the electrical system to a 42 V standard. A 42 V standard architecture will enable the addition of technologies that would improve fuel economy, such as start/stop strategies and torque boosters, decrease the weight of the overall wiring, and allow the use of advanced solid state circuitry that facilitates advanced technology.

A need has developed for a watercraft that can alternately operate at low speeds while minimizing noise and environmental pollution and at higher speeds where increased power is desired.

In the field of land-driven wheeled vehicles such as automobiles, one way environmental concerns have been addressed is to provide a "hybrid" vehicle, which uses a hybrid gas/electric power system. For example, an article entitled "High Bred Hybrids" in the March 2001 issue of *Popular Science*, which is hereby incorporated herein by reference, describes the simultaneous and/or alternating use of engines and electric motors to power automobiles.

In conventional watercraft with jet propulsion systems, the engine's crankshaft is permanently rotationally coupled to the impeller of the jet propulsion unit. Accordingly, even when the engine is idling and the operator is not actuating the throttle, the impeller rotates. Consequently, even when the operator does not intend to have the watercraft move, the jet propulsion unit creates at least some thrust. Similarly, to start the engine, a starter motor must simultaneously start the engine and drive the propulsion system.

In waterways near docks, inlets, etc., it is common to have low maximum speed limits for watercraft. To ensure that an operator's watercraft does not exceed such speed limits, the watercraft operator must currently continuously monitor the watercraft's gauges while simultaneously maneuvering the watercraft within such obstacle-laden waterways.

SUMMARY OF THE INVENTION

Therefore, one aspect of embodiments of this invention provides a watercraft with a power system that can alternately minimize noise and environmental pollution at lower speeds and maximize power and speed at higher speeds.

Another aspect of embodiments of the present invention provides a watercraft with an increased electrical power source.

A further aspect of embodiments of the present invention provides a watercraft with a jet propulsion system having an impeller that can be selectively rotationally, disconnected from the power plant's output shaft. Disengageability between the impeller and the power plant (which typically includes an internal combustion engine) enables the jet propulsion system to provide zero thrust while still running the engine. It may also enable a starter motor to more easily start the engine because the starter need not also simultaneously drive the propulsion system.

A further aspect of embodiments of the invention provides a "shore button" on a watercraft. Actuating the shore button limits the speed of the watercraft's power plant (e.g., engine, electric motor, etc.) so as to prevent the watercraft from exceeding a predetermined maximum speed. If the predetermined maximum speed corresponds to a speed limit in a waterway, a watercraft operator can turn on the shore button when the watercraft enters the reduced speed area.

A further aspect of embodiments of the invention provides a watercraft with a hybrid ICE/electric power source.

A further aspect of embodiments of the present invention provides a power plant that easily converts between a fuel and electric power source.

A further aspect of embodiments of the present invention provides a power source that is clean in the sense that it does not contribute to air pollution and generates low noise under certain modes of operation.

A further aspect of embodiments of the present invention provides a power source that has improved acceleration due to high torque.

A further aspect of embodiments of the present invention is that an alternate power source can be used at low speeds, for example when trolling.

In summary, embodiments of this invention are directed to a watercraft having a hull with port and starboard sides and a stern. A propulsion system is supported by the hull. A drive shaft operatively connects to the propulsion system to propel the propulsion system and watercraft. A power plant is supported by the hull. The power plant includes an electrical turning machine (ETM) having an output shaft operatively connected to the drive shaft, an internal combustion engine having a crankshaft operatively connected to the drive shaft and the output shaft, a clutch coupled between the output shaft of the ETM and the crankshaft of the engine to selectively engage the ETM and the engine in a driving relationship, and a battery source selectively operatively connected to the ETM. The watercraft also includes a controller connected to the power plant that controls driving of the drive shaft by the power plant.

According to a further aspect of the present invention, the propulsion system is a jet propulsion system with an impeller operatively connected to the drive shaft.

According to a further aspect of the present invention, the output shaft of the ETM is coupled to a first portion of the clutch, and the crankshaft of the engine is coupled to a second portion of the clutch, wherein the controller controls the clutch to selectively disengage the crankshaft from the output shaft.

The battery source may include a DC main battery. An auxiliary DC battery having a different voltage than the main DC battery may be provided. A DC/DC converter selectively electrically connects the first DC battery to the second DC battery. The main battery may be a 42 V battery and the auxiliary battery may be a 14 V battery.

The ETM may be a generator or a motor. For example, the ETM may be a DC electric motor and/or a starter and/or a generator. Alternatively, the ETM may be an AC electric motor/starter/generator. The watercraft may also include a rectifier/inverter coupled between the AC starter/generator and the main battery.

The controller preferably controls a supply of electrical power between the ETM and the battery source.

The clutch may be a centrifugal clutch that engages the output shaft of the ETM with the crankshaft of the engine when a rotational speed of the output shaft exceeds a predetermined speed.

The controller preferably is operatively connected to the battery source to sense a charge level of the battery source. The controller may also be operatively connected to the engine to control a throttle of the engine.

The watercraft may further include an operator-controlled throttle lever, wherein the controller is operatively connected to the throttle lever to sense a position of the throttle lever that corresponds to a desired watercraft speed. When (a) the throttle lever position is in a low throttle lever range and (b) the charge level of the battery source is above a predetermined minimum charge level, the controller disengages the clutch, turns off the engine, and operates the ETM in motor mode at a power level proportionally corresponding to the throttle lever position.

The watercraft may further include an operator-actuated shore button operatively connected to the controller to selectively limit a driving power applied to the propulsion system by the power plant. According to a further aspect of the present invention, the controller detects a charge level of the battery source, and when (a) the shore button is on and (b) the charge level of the battery source is above a predetermined minimum charge level, the controller sends a signal to disengage the clutch, turn off the engine, and operate the ETM in motor mode at a power level below a predetermined maximum low power corresponding to a maximum desired low speed.

According to a further aspect of the present invention, the controller detects a charge level of the battery source. When the charge level of the battery source falls below a predetermined minimum charge level, the controller sends a signal to engage the clutch, turn on the engine, and operate the ETM in generator mode.

According to a further aspect of the present invention, the crankshaft is indirectly operatively connected to the drive shaft by way of the output shaft and the clutch such that the crankshaft is rotationally coupled to the output shaft whenever the crankshaft is rotationally coupled to the drive shaft. The output shaft may be permanently rotationally coupled to the drive shaft.

According to a further aspect of the present invention, the watercraft also includes a second clutch that is coupled between the drive shaft and the output shaft of the ETM to selectively disengage the ETM from the propulsion system. The second clutch may be coupled between the drive shaft and the crankshaft of the engine such that when the second clutch is disengaged, the drive shaft is not rotationally coupled to the engine or the ETM.

The second clutch may be coupled between the output shaft of the ETM and the crankshaft of the, engine. The ETM may be an integrated starter/generator. The controller selectively operatively connects the battery source to the ETM to selectively operate the ETM in motor mode, generator mode, and off mode. The controller controls the second clutch and disengages the second clutch when the controller selectively operates the ETM in off mode.

The second clutch may be coupled between the crankshaft of the engine and the drive shaft.

The watercraft may further include a third clutch that is coupled between the output shaft of the ETM and the drive shaft to selectively disengage the ETM and the propulsion system. The third clutch may be coupled between the output shaft and the crankshaft such that when the third clutch is disengaged, the output shaft of the ETM is not rotationally coupled to the crankshaft of the engine.

The invention is also directed to a method of operating a watercraft that includes a hull having port and starboard sides and a stern, a propulsion system supported by the hull to propel the watercraft, a ETM having an output shaft operatively connected to the propulsion system, an internal combustion engine having a crankshaft operatively connected to the drive shaft, and a clutch coupled between the ETM and the engine to selectively engage the ETM and the engine in a driving relationship, and a battery source selectively operatively connected to the ETM. The, method includes disengaging the clutch, electrically connecting the battery source to the ETM to operate the ETM in a motor mode, and driving the propulsion system using the ETM without rotating the crankshaft.

The method may further include engaging the clutch, running the engine, and electrically connecting the battery source to the ETM to operate the ETM in a generator mode and charge the battery source when a charge level of the battery source is below a predetermined charge level.

The method may further include disengaging the clutch, turning off the engine, and operating the ETM in the motor mode when (a) a throttle lever position is in a low throttle lever range and (b) the charge level of the battery source is above a predetermined charge level.

The watercraft may further include an operator-actuated shore button. The method may further include disengaging the clutch, turning off the engine, and operating the ETM in the motor mode when the shore button is on and a charge level of the battery source is above a predetermined charge level.

The method may further include driving the propulsion system by selecting between the ETM and the engine as a mechanical power source for the propulsion system.

The watercraft may further include a second clutch coupled between the ETM and the propulsion system but not between the ETM and the engine. The method further includes engaging the clutch, disengaging the second clutch, and driving the propulsion system using the engine without rotating the output shaft of the ETM.

The invention is also directed to a watercraft that has a hull with port and starboard sides and a stern, a propulsion system having a drive shaft supported by the hull; and a power plant having an output shaft operatively connected to the propulsion system. The watercraft also includes an operator-actuated switch having first and second operational modes and a controller that is connected to the power plant to control the speed of the drive shaft and connected to the switch to sense the operational mode of the switch. The controller prevents the drive shaft from rotating faster than a predetermined speed when the switch is in its first operational mode and allows the drive shaft to rotate faster than the predetermined speed when the switch is in the second operational mode.

The invention is also directed to a method of operating a watercraft, the watercraft having a hull with port and starboard sides and a stern, a propulsion system with a drive shaft supported by the hull to propel the watercraft, a power plant having an output shaft operatively connected to the propulsion system, and an operator-actuated switch having first and second operational modes. The method includes sensing the operational mode of the switch, preventing the drive shaft from rotating faster than a predetermined speed when the switch is in its first operational mode, and allowing the drive shaft to rotate faster than a predetermined speed when the switch is in its second operational mode.

According to a further aspect of embodiments of the present invention, the power plant includes an internal combustion engine, and preventing the drive shaft from rotating faster than the predetermined speed includes limiting the speed of the engine.

According to a further aspect of embodiments of the present invention, the power plant includes an ETM and an internal combustion engine, and preventing the drive shaft from rotating faster than the predetermined speed includes rotationally disengaging the engine from the drive shaft while driving the drive shaft using the ETM.

The invention is also directed to a watercraft that includes a hull having port and starboard sides and a stern, a jet propulsion system including an impeller supported by the hull, a drive shaft operatively connected to the impeller of the jet propulsion system to propel the jet propulsion system and watercraft, a power plant having an output shaft, and a selectively engagable clutch coupled between the output shaft and drive shaft to selectively engage the power plant and jet propulsion system in a driving relationship. The power plant may include an internal combustion engine and/or an ETM. The clutch may be a centrifugal clutch that rotationally engages the output shaft and drive shaft when the rotational speed of the output shaft exceeds a predetermined minimum speed.

The watercraft may also include an operator controlled throttle device. The operator controlled throttle device controls the clutch such that the clutch engages the output shaft and drive shaft when the operator controlled throttle device is actuated.

The watercraft may also include a clutch controller that engages the clutch when a sensed speed of the output shaft exceeds a predetermined minimum speed.

The watercraft may be a personal watercraft with a straddle seat for an operator supported by the hull.

The invention is also directed to a method of operating a watercraft that includes a hull having port and starboard sides and a stern, a jet propulsion system including an impeller supported by the hull, a drive shaft operatively connected to the impeller of the jet propulsion system to propel the jet propulsion system and watercraft, a power plant having an output shaft, and a selectively engagable clutch coupled between the output shaft and drive shaft. The method includes disengaging the clutch while the output shaft is rotating, and engaging the clutch while the output shaft is rotating.

The invention is also directed to a watercraft that includes a hull having port and starboard sides and a stern, a propulsion system supported by the hull, and a drive shaft operatively connected to the propulsion system to propel the propulsion system and watercraft. The watercraft further includes a hull-supported power plant that includes an ETM having an output shaft operatively connected to the drive shaft, and an internal combustion engine having a crankshaft operatively connected to the drive shaft and the output shaft. The watercraft further includes a battery source selectively operatively connected to the ETM, and a controller connected to the ETM and the engine. The controller selectively operates the power plant and propulsion system in any one of at least three operational modes; a first operational mode in which just the ETM drives the propulsion system, a second operational mode in which just the engine drives the propulsion system, and a third operational mode in which both the ETM and the engine drive the propulsion system. The drive shaft, output shaft, and crankshaft may each permanently rotationally coupled to each other.

According to a further aspect of the present invention, the ETM includes a motor/generator, and the controller selectively operates the power plant and propulsion system in a fourth operational mode in which (a) the engine drives both the ETM and the propulsion system, and (b) the controller operatively connects the ETM to the battery source to charge the battery source.

Additional and/or alternative aspects of this invention will become apparent upon reading the following disclosure in accordance with the Figures.

BRIEF DESCRIPTION OF THE DRAWINGS

An understanding of the various embodiments of the invention may be gained by virtue of the following figures, of which like elements in various figures will have common reference numbers, and wherein.

DETAILED DESCRIPTION

The invention is described with reference to a PWC for purposes of illustration only. However, it is to be understood that the hybrid power system described herein can be utilized in any watercraft, particularly those crafts that are powered by a jet propulsion system, such as sport boats. However, the invention is applicable to conventional propulsion systems as well, such as propeller-driven watercraft.

The general construction of a personal watercraft (PWC) 10 in accordance with a preferred embodiment of this invention is shown in FIGS. 1–5. The following description relates to one way of manufacturing a personal watercraft according to a preferred design. Obviously, those of ordinary skill in the watercraft art will recognize that there are other known ways of manufacturing and designing watercraft and that this invention would encompass other known ways and designs.

Figure 1:
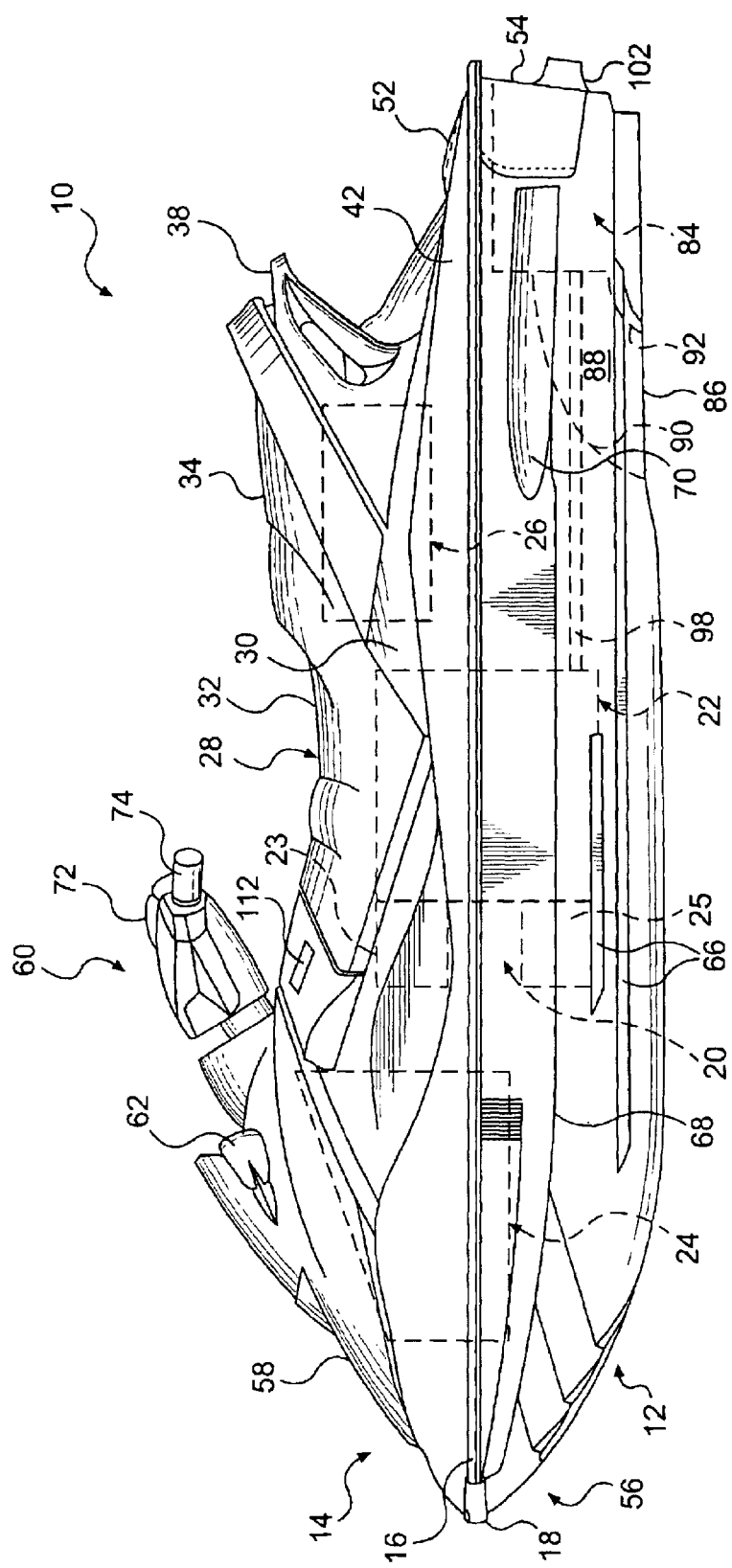
FIG. 1 illustrates a side view of one type of watercraft in accordance with a preferred embodiment of the invention.

The watercraft 10 of FIG. 1 is made of two main parts, including a hull 12 and a deck 14. The hull 12 buoyantly supports the watercraft 10 in the water. The deck 14 is designed to accommodate a rider and, in some watercraft, one or more passengers. The hull 12 and deck 14 are joined together at a seam 16 that joins the parts in a sealing relationship. Preferably, the seam 16 comprises a bond line formed by an adhesive. Of course, other known joining methods could be used to sealingly engage the parts together, including but not limited to thermal fusion, molding or fasteners such as rivets or screws. A bumper 18 generally covers the seam 16, which helps to prevent damage to the outer surface of the watercraft 10 when the watercraft is docked, for example. The bumper 18 can extend around the bow, as shown, or around any portion or all of the seam 16.

The space between the hull 12 and the deck 14 forms a volume commonly referred to as the engine compartment 20 (shown in phantom in FIG. 1). Shown schematically in FIG. 1, the engine compartment 20 accommodates a hybrid power plant 22 as well as a muffler, tuning pipe, gas tank, electrical system (battery source 25, etc.), controller 23, air box, storage bins 24, 26, and other elements required or desirable in the watercraft 10.

Figure 2:
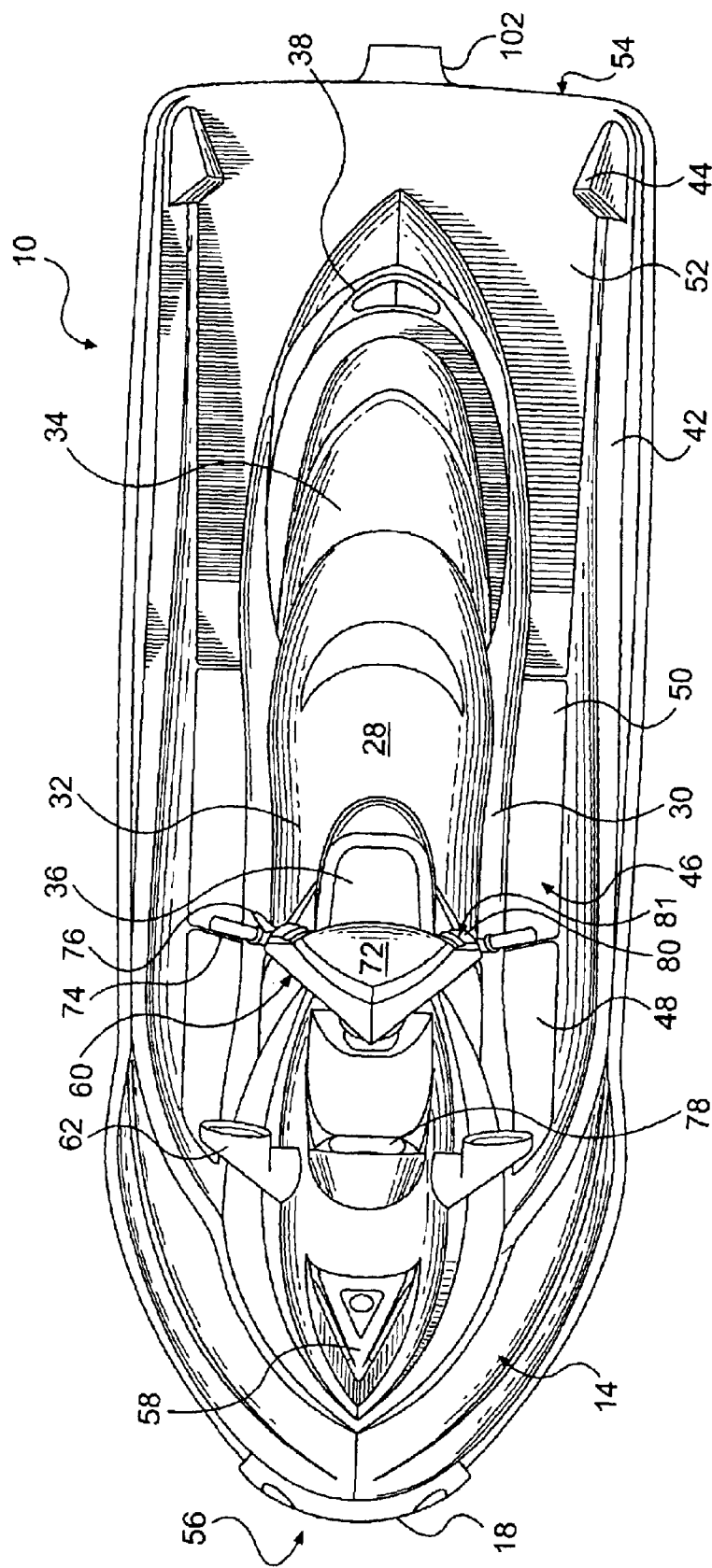
FIG. 2 is a top view of a watercraft according to FIG. 1.

As seen in FIGS. 1 and 2, the deck 14 has a centrally positioned straddle-type seat 28 positioned on top of a pedestal 30 to accommodate a rider in a straddling position. The seat 28 may be sized to accommodate a single rider or sized for multiple riders. For example, as seen in FIG. 2, the seat 28 includes a first, front seat portion 32 and a rear, raised seat portion 34 that accommodates a passenger. The seat 28 is preferably made as a cushioned or padded unit or interfitting units. The first and second seat portions 32, 34 are preferably removably attached to the pedestal 30 by a hook and tongue assembly (not shown) at the front of each seat and by a latch assembly (not shown) at the rear of each seat, or by any other known attachment mechanism. The seat portions 32, 34 can be individually tilted or removed completely. One of the seat portions 32, 34 covers a power plant 22 access opening (in this case above power plant 22) defined, by a top portion of the pedestal 30 to provide access to the power plant 22 (FIG. 1). The other seat portion (in this case portion 34) can cover a removable storage box 26 (FIG. 1). A "glove compartment" or small storage box 36 may also be provided in front of the seat 28.

Figure 4:
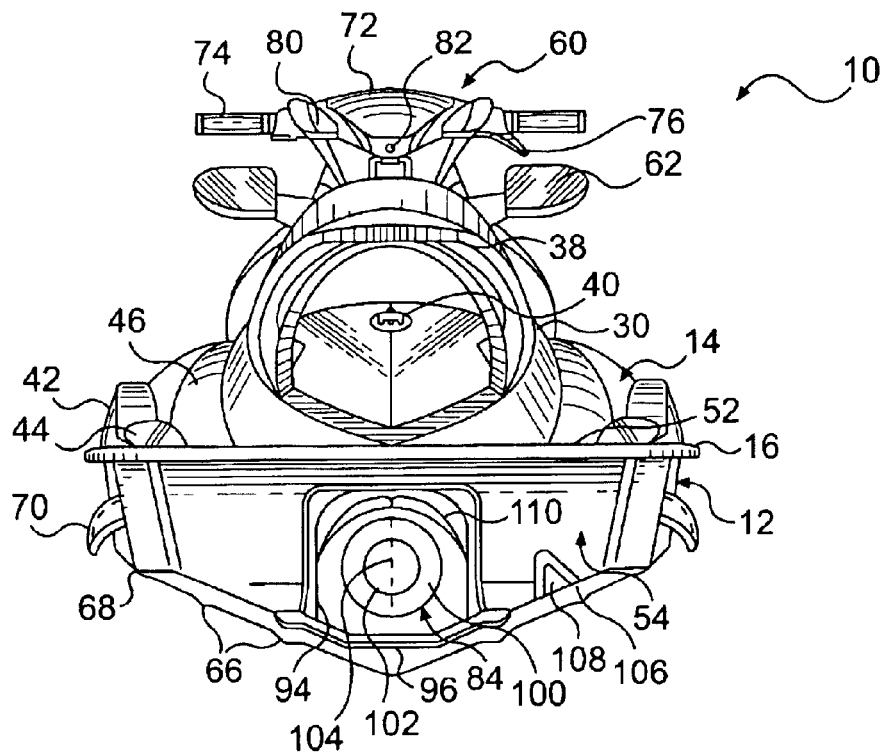
FIG. 4 is a back view of a watercraft according to FIG. 1.

As seen in FIG. 4, a grab handle 38 may be provided between the pedestal 30 and the rear of the seat 28 to provide a handle onto which a passenger may hold. This arrangement is particularly convenient for a passenger seated facing backwards for spotting a water skier, for example. Beneath the handle 38, a tow hook 40 is mounted on the pedestal 30. The tow hook 40 can be used for towing a skier or floatation device, such as an inflatable water toy.

As best seen in FIGS. 2 and 4 the watercraft 10 has a pair of generally upwardly extending walls located on either side of the watercraft 10 known as gunwales or gunnels 42. The gunnels 42 help to prevent the entry of water in the footrests 46, provide lateral support for the rider's feet, and also provide buoyancy when turning the watercraft 10, since personal watercraft roll slightly when turning. Towards the rear of the watercraft 10, the gunnels 42 extend inwardly to act as heel rests 44. Heel rests 44 allow a passenger riding the watercraft 10 facing towards the rear, to spot a waterskier for example, to place his or her heels on the heel rests 44, thereby providing a more stable riding position. Heel rests 44 could also be formed separate from the gunnels 42.

Located on both sides of the watercraft 10, between the pedestal 30 and the gunnels 42 are the pair of footrests 46. The footrests 46 are designed to accommodate a rider's feet in various riding positions. To this effect, the footrests 46 each have a forward portion 48 angled such that the front portion of the forward portion 48 (toward the bow of the watercraft 10) is higher, relative to a horizontal reference point, than the rear portion of the forward portion 48. The remaining portions of the footrests 46 are generally horizontal. Of course, any contour conducive to a comfortable rest for the rider could be used. The footrests 46 may be covered by carpeting 50 made of a rubber-type material, for example, to provide additional comfort and traction for the feet of the rider.

A reboarding platform 52 is provided at the rear of the watercraft 10 on the deck 14 to allow the rider or a passenger to easily reboard the watercraft 10 from the water. Carpeting or some other suitable covering may cover the reboarding platform 52. A retractable ladder (not shown) may be affixed to the transom 54 to facilitate boarding the watercraft 10 from the water onto the reboarding platform 52.

Figure 3:
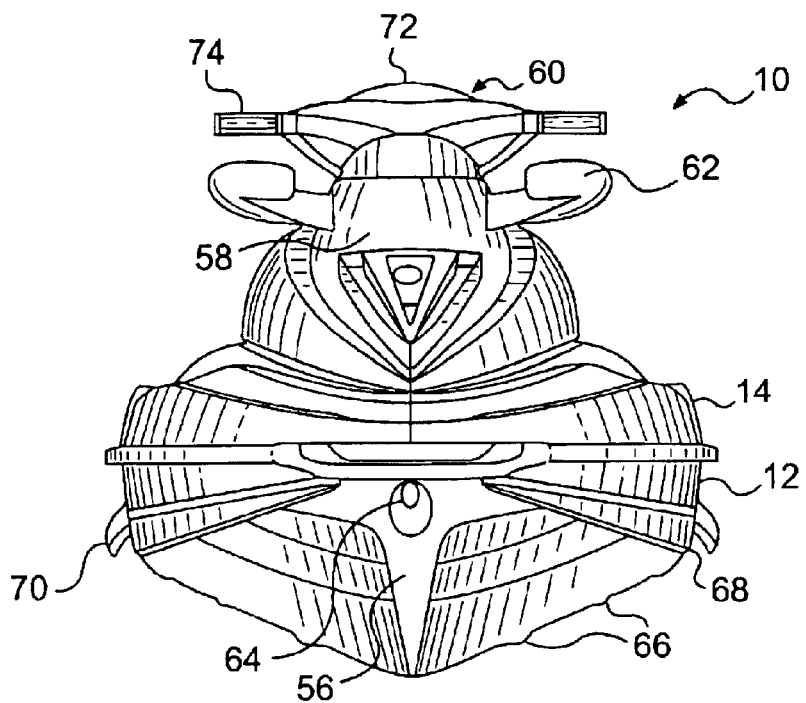
FIG. 3 is a front view of a watercraft according to FIG. 1.

Referring to the bow 56 of the watercraft 10, as seen in FIGS. 2 and 3, watercraft 10 is provided with a hood 58 located forwardly of the seat 28 and a helm assembly 60. A hinge (not shown) is attached between a forward portion of the hood 58 and the deck 14 to allow hood 58 to move to an open position to provide access to the front storage bin 24 (FIG. 1). A latch (not shown) located at a rearward portion of hood 58 locks hood 58 into a closed position. When in the closed position, hood 58 prevents water from entering front storage bin 24. Rearview mirrors 62 are positioned on either side of hood 58 to allow the rider to see behind. A hook 64 is located at the bow 56 of the watercraft 10. The hook 64 is used to attach the watercraft 10 to a dock when the watercraft is not in use or to attach to a winch when loading the watercraft on a trailer, for instance.

Figure 5:
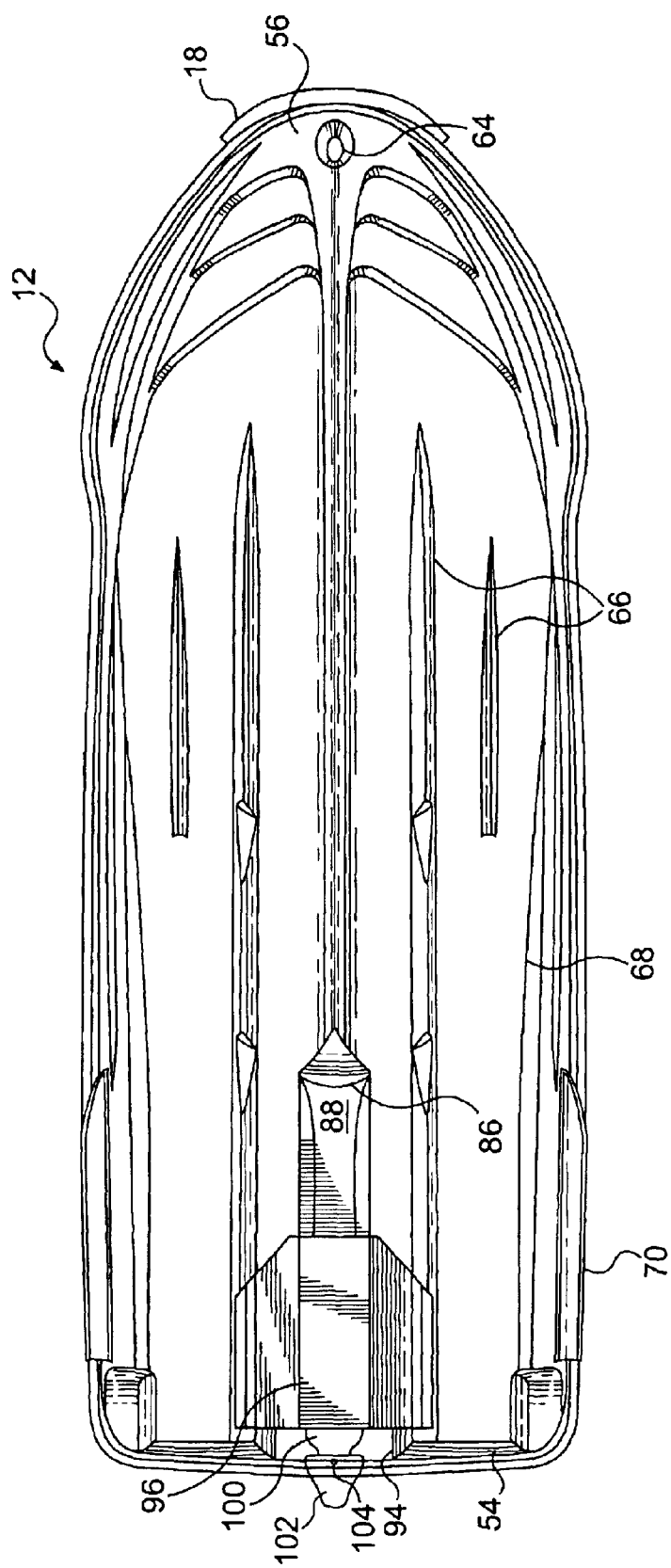
FIG. 5 is a bottom view of the hull of a watercraft according to FIG. 1.

As best seen in FIGS. 3, 4, and 5, the hull 12 is provided with a combination of strakes 66 and chines 68. A strake 66 is a protruding portion of the hull 12. A chine 68 is the vertex formed where two surfaces of the hull 12 meet. The combination of strakes 66 and chines 68 provide the watercraft 10 with its riding and handling characteristics. Sponsons 70 are located on both sides of the hull 12 near the transom 54. The sponsons 70 preferably have an arcuate undersurface that gives the watercraft 10 both lift while in motion and improved turning characteristics. The sponsons are preferably fixed to the surface of the hull 12 and can be attached to the hull by fasteners or molded therewith. Sometimes it may be desirable to adjust the position of the sponson 70 with respect to the hull 12 to change the handling characteristics of the watercraft 10 and accommodate different riding conditions.

As best seen in FIGS. 3 and 4, the helm assembly 60 is positioned forwardly of the seat 28. The helm assembly 60 has a central helm portion 72, that may be padded, and a pair of steering handles 74, also referred to as a handle bar. One of the steering handles 74 is preferably provided with a throttle lever 76, which allows the rider to control the speed of the watercraft 10. As seen in FIG. 2, a display area or cluster 78 is located forwardly of the helm assembly 60. The display cluster 78 can be of any conventional display type, including a liquid crystal display (LCD), dials or light emitting diodes (LEDs). The central helm portion 72 may also have various buttons 80, which could alternatively be in the form of levers or switches, that allow the rider to modify the display data or mode (speed, engine rpm, time . . . ) on the display cluster 78 or to change a condition of the watercraft 10 such as trim (the pitch of the watercraft).

Preferably, one of the buttons 80 on the helm portion 72 is a "shore button" 81, which may be activated by the operator when the watercraft 10 is near the shore, a dock, etc. to limit the speed and noise of the watercraft 10. The shore button 81 is operatively connected to the controller 23 to control the power plant 22 for the propulsion system 84 of the watercraft 10. By activating the shore button 81 as described in detail below, the user can selectively elect an electric power supply to limit emissions and noise. The shore button is optional and the invention can be employed without it, in which case the power source would be automatically controlled by the controller 23. The shore button 81 may alternatively comprise any of a variety of other known switches such as a toggle switch.

The shore button 81 may alternatively be used as an engine 230 governor. In such an embodiment, the controller 23 would limit the speed of the engine 230 when the shore button is activated. Such a shore button 81 could operate in a similar fashion as the governor button employed in Formula 1 race cars to limit the car's speed in the pit area. Furthermore, the watercraft 10 may be provided with an operator-controlled adjustment mechanism (such as a rotating knob, digital adjustment mechanism, etc.) that adjusts the maximum allowed speed when the shore button 81 is activated. Consequently, the operator of the watercraft 10 can adjust the effect of the shore button 81 to match a watercraft speed limit in the surrounding waterway.

The helm assembly 60 may also be provided with a key receiving post 82, preferably located near a center of the central helm portion 72. The key receiving post 82 is adapted to receive a key (not shown) that starts the watercraft 10. As is known, the key is typically attached to a safety lanyard (not shown). It should be noted that the key receiving post 82 may be placed in any suitable location on the watercraft 10.

Returning to FIGS. 1 and 5, the watercraft 10 is generally propelled by a jet propulsion system 84, that includes a jet pump. As known, the jet propulsion system 84, pressurizes water to create thrust. The water is first scooped from under the hull 12 through an inlet 86, which preferably has a grate (not shown in detail). The inlet grate prevents large rocks, weeds, and other debris from entering the jet propulsion system 84, which may damage the system or negatively affect performance. Water flows from the inlet 86 through a water intake ramp 88. The top portion 90 of the water intake ramp 88 is formed by the hull 12, and a ride shoe (not shown in detail) forms its bottom portion 92. Alternatively, the intake ramp 88 may be a single piece or an insert to which the jet propulsion system 84 attaches. In such cases, the intake ramp 88 and the jet propulsion system 84 are attached as a unit in a recess in the bottom of hull 12.

From the intake ramp 88, water enters the jet propulsion system 84. The jet propulsion system 84 is located in a formation in the hull 12, referred to as the tunnel 94. The tunnel 94 is defined at the front, sides, and top by the hull 12 and is open at the transom 54. The bottom of the tunnel 94 is closed by the ride plate 96. The ride plate 96 creates a surface on which the watercraft 10 rides or planes at high speeds.

The jet propulsion system 84 includes a jet pump that is made of two main parts: the impeller (not shown) and the stator (not shown). The impeller is coupled to the power plant 22 by one or more shafts 98, such as a drive shaft and an impeller shaft. The rotation of the impeller pressurizes the water, which then moves over the stator that is made of a plurality of fixed stator blades (not shown). The role of the stator blades is to decrease the rotational motion of the water so that almost all the energy given to the water is used for thrust, as opposed to swirling the water. Once the water leaves the jet propulsion system 84, it goes through a venturi 100. Since the ventuni's exit diameter is smaller than its entrance diameter, the water is accelerated further, thereby providing more thrust. A steering nozzle 102 is pivotally attached to the venturi 100 so as to pivot about a vertical axis 104. The steering nozzle 102 could also be supported at the exit of the tunnel 94 in other ways without a direct connection to the venturi 100. Alternatively, a steering rudder could be positioned at the outlet of the venturi 100 to selectively divert the thrust to effect steering.

The steering nozzle 102 is operatively connected to the helm assembly 60 preferably via a push-pull cable (not shown) such that when the helm assembly 60 is turned, the steering nozzle 102 pivots. This movement redirects the thrust from the venturi 100, so as to steer the watercraft 10 in the desired direction. Optionally, the steering nozzle 102 may be gimbaled to allow it to move around a second horizontal pivot axis (not shown). The up and down movement of the steering nozzle 102 provided by this additional pivot axis is known as trim and controls the pitch of the watercraft 10.

When the watercraft 10 is moving, its speed is measured by a speed sensor 106 attached to the transom 54 of the watercraft 10. The speed sensor 106 has a paddle wheel 108 that is turned by the flow of water. In operation, as the watercraft 10 goes faster, the paddle wheel 108 turns faster in correspondence. An electronic control unit (not shown) connected to the speed sensor 106 converts the rotational speed of the paddle wheel 108 to the speed of the watercraft 10 in kilometers or miles per hour, depending on the rider's preference. The speed sensor 106 may also be placed in the ride plate 96 or at any other suitable position. Other types of speed sensors, such as pitot tubes, and processing units could be used, as would be readily recognized by one of ordinary skill in the art.

The watercraft 10 may be provided with the ability to move in a reverse direction. With this option, a reverse gate 110, seen in FIG. 4, is used. The reverse gate 110 is pivotally attached to the sidewalls of the tunnel 94 or directly on the venturi 100 or the steering nozzle 102. To make the watercraft 102 move in a reverse direction, the rider pulls on a, reverse handle 112 (FIG. 1) operatively connected to the reverse gate 110. The reverse gate 110 then pivots in front of the outlet of the steering nozzle 102 and redirects the water exiting the jet propulsion system 84 towards the front of the watercraft, thereby thrusting the watercraft 10 rearwardly. The reverse handle 1112 can be located in any convenient position near the operator, for example adjacent the seat 28 as shown or on the helm 60.

Figure 6:
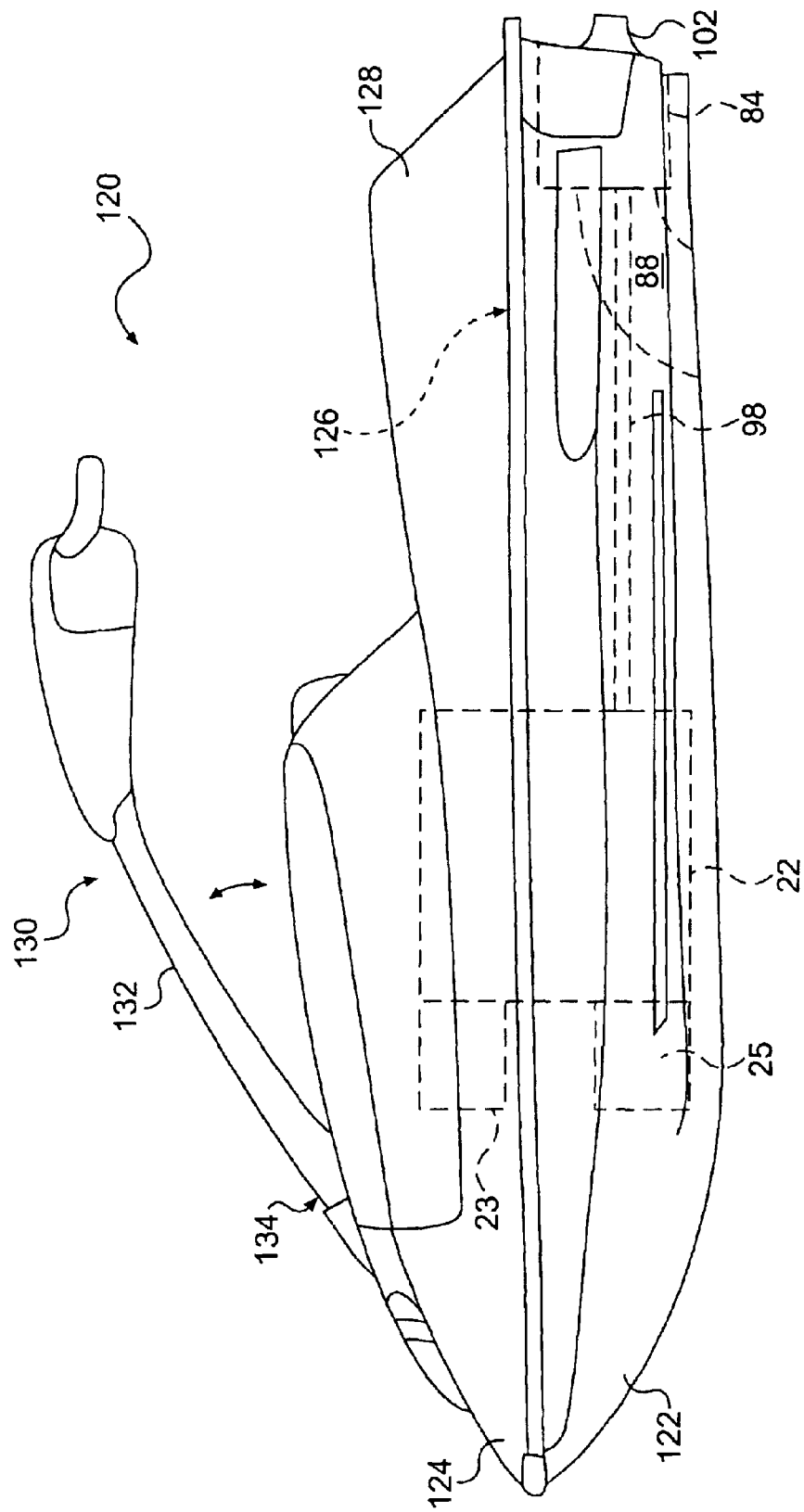
FIG. 6 illustrates an alternative stand-up type watercraft.

Alternatively, this invention can be embodied in a stand-up type personal watercraft 120, as seen in FIG. 6. Stand-up watercraft 120 are often used in racing competitions and are known for high performance characteristics. Typically, such stand-up watercraft 120 have a lower center of gravity and a more concave hull 122. The deck 124 may also have a lower profile. In this watercraft 120, the seat is replaced with a standing platform 126. The operator stands on the platform 126 between the gunnels 128 to operate the watercraft. The steering assembly 130 is configured as a pivoting handle pole 132 that tilts up from a pivot point 134 during operation, as shown in FIG. 6. At rest, the handle pole 132 folds downwardly against the deck 124 toward the standing platform 126. Otherwise, the components and operation of the watercraft 120 are similar to watercraft 10.

Referring to the power plant 22 in accordance with the invention, FIGS. 7–11 show several possible implementations of a hybrid power system 200, 799, 900, 1000. Although described as implemented in the PWC 10, for purposes of illustration, it will be understood that the power plant 22 can be implemented in various types of watercraft.

Figure 7:
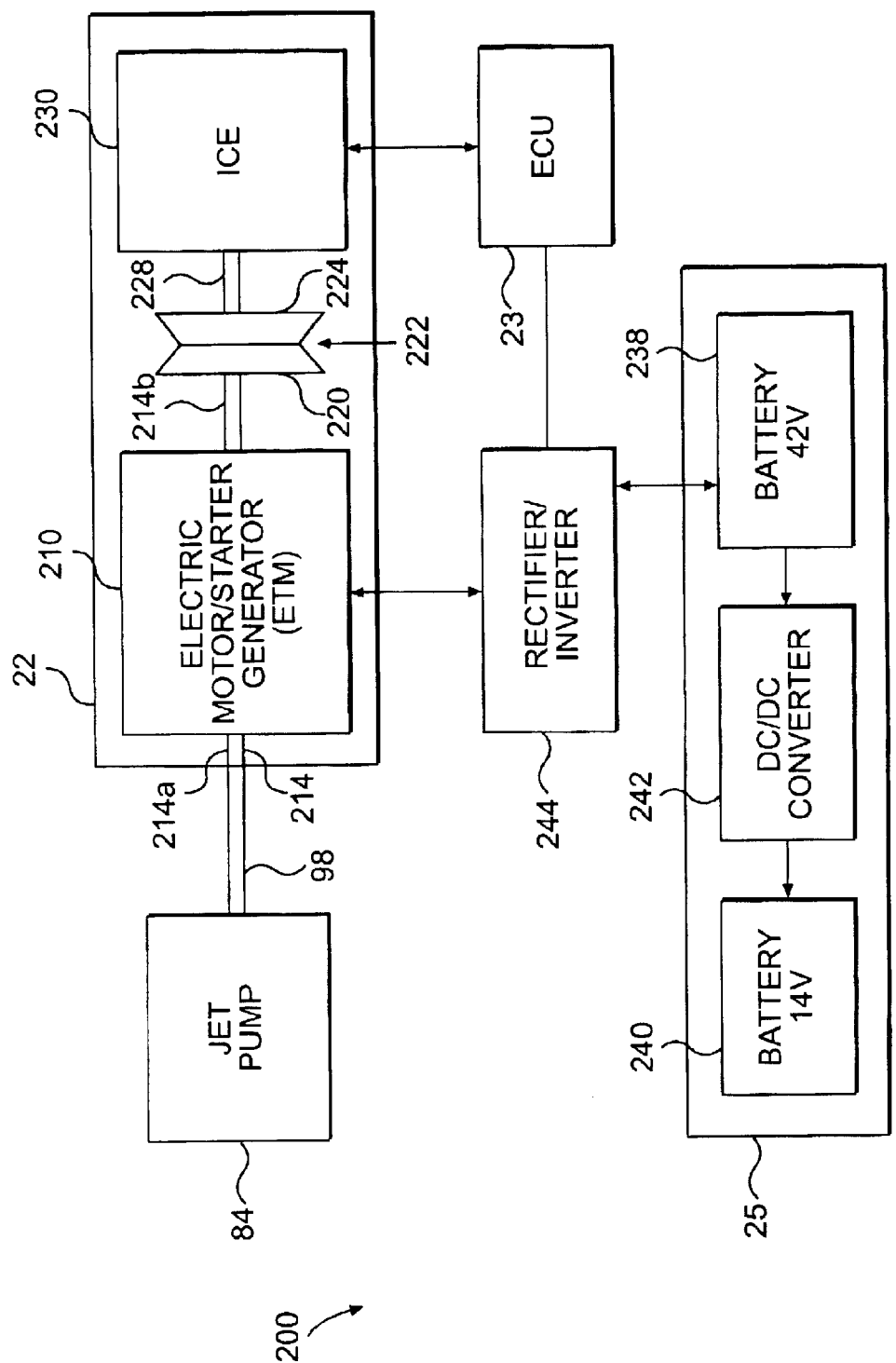
FIG. 7 is a block diagram showing the power plant, controller, and battery system in accordance with a preferred embodiment of the invention.

FIG. 7 is a block diagram illustrating the functional relationship between the various components of the hybrid power system 200 including the power plant 22, the controller 23, the jet propulsion system 84, and the battery source 25. The power plant 22 includes an electrical turning machine (ETM) 210 that is operatively connected to an internal combustion engine 230. The ETM 210 is preferably an 8 kW (kilowatt) starter/generator such as the Integrated Starter Generator (ISG) available from Siemens Automotive, which is described in the article titled "Siemens starter/generator for 2002" on page 56 of AEI (Automotive Engineering International), January 2001, which is hereby incorporated herein by reference. The starter/generator ETM 210, such as the Siemens ISG, is advantageous because it incorporates an engine starter, a generator (motor), and a flywheel in a single unit. An additional advantage is that the ETM 210, like the Siemens ISG, uses a 42 V vehicle electrical system, which provides more power and allows for the use of smaller wires, which provides a more lightweight system relative to a standard 12–14 system. However, the ETM 210 may be any type of generator, motor, and/or starter. The internal combustion engine 230 is a conventional engine, which maybe two stroke or four stroke.

The power plant 22 is operatively connected to the drive shaft 98 of the jet propulsion system 84 to provide a driving force. The connection may be a separate output shaft operatively coupled to the ETM 210 and the engine 230 or may be one end 214a of a shaft of the ETM 210 as schematically shown in FIG. 7. The other end 214b of the output shaft 214 is operatively connected to a first side 220 of a selectively disengagable clutch 222. The output shaft 214 may be formed as a single shaft with first and second axial ends 214a, 214b that protrude from opposite sides of the ETM 210 or may be a series of shafts interconnected to transmit a driving force.

Alternatively, both the shaft 98 and the first side 220 of the clutch 222 may be operatively connected to the output shaft 214 at the same axial end of the output shaft 214 (via gears, belts, etc.). A second side 224, of the clutch 222 is operatively connected to a crankshaft 228 of the engine 230. Accordingly, the engine 230 is operatively connected to the drive shaft 98 via the operative connection between the engine 230 and the ETM 210.

Except where otherwise specifically defined herein, the term clutch is intended to encompass any and all devices capable of selectively rotationally engaging and disengaging two rotating shafts.

In FIG. 7, the shaft 98, output shaft 214, and crankshaft 228 are all shown axially aligned. While such alignment is preferred for simplicity, various other orientations of the various shafts 98, 214, 228 may be used without departing from the scope of the present invention. For example, bevel gears could be used to rotate the crankshaft 228 at an angle of 90 degrees such that the crankshaft 228 of the engine 230 is generally vertically oriented.

The battery source 25 comprises a main battery 238, in this case a 42 V battery, coupled to an auxiliary battery 240, in this case a 14 V battery, with a DC/DC converter 242. As known, the converter 242 changes a first input voltage to a second output voltage. The main battery 238 is electrically connected to the ETM 210 to provide electrical power to the ETM 210 and to receive electrical power generated by the ETM 210. The auxiliary battery 240 is used to power peripheral electrical components on the vehicle 10. The auxiliary battery 240 also receives charge from the ETM 210 via the main battery 238 and converter 242.

A power converter 244, preferably in the form of a rectifier/inverter, is disposed between the ETM 210 and the main battery 238. The controller 23 is preferably an electronic control unit (ECU) such as a microprocessor or other type of known electronic control assembly. The controller 23 is electrically connected between the power plant 22 and the battery source 25 by way of the power converter 244 to control the operating functions described below. The controller 23 may also receive operator inputs, if desired, such as the throttle setting to control the speed of the engine 230 and governor settings to limit certain power plant 22 functions. Alternatively, the watercraft operator may assume some of the functions of the controller 23.

The controller 23 selectively operates the ETM 210 in one of three operating modes, MOTOR, GENERATOR, and OFF, under conventional operating conditions. To start the engine 230, the ETM 210 is started and operated in the MOTOR mode such that the output shaft 214 is driven to drive the crankshaft 228 of the engine 230. Once the engine 230 is started, if the main battery 238 is sufficiently charged, controller 23 turns the ETM 210 OFF and the speed of the engine 230 is controlled by a throttle lever 76 to drive the drive shaft 98 of the jet pump 84. Conversely, if the main battery 238 is not sufficiently charged after the ETM 210 starts the engine 230, the controller 23 operates the ETM 210 in GENERATOR mode.

In the MOTOR mode, electrical power is supplied from the main battery 238 to the ETM 210 to drive the ETM 210 to rotate the output shaft 214. In the MOTOR mode, the ETM 210 rotates the shaft 214 to engage the drive shaft 98 of the drive pump 84 and, if the clutch 222 is engaged, to provide a driving force to the crankshaft 228 of the engine 230. Thus, in the MOTOR mode, the ETM 210 can act as a power source for the propulsion unit 84 and can act as a starter for the engine 230.

In the GENERATOR mode, the engine is running using its combustible energy source with the clutch 222 engaged. In the GENERATOR mode, the ETM 210 receives a driving force from the crankshaft 228 and converts that rotating force into electrical energy (current) that is transferred and stored in the battery source 25. Thus, the ETM 210 functions as a generator and recharges the battery source 25, including the main battery 238 and the auxiliary battery 240.

In the OFF mode, the ETM 210 is electrically disconnected from the battery source 25 such that the battery source 25 does not power the ETM 210 and the ETM 210 does not charge the battery source 25. Consequently, when in the OFF mode, the ETM 210 simply rotates with the shafts 228, 214, and 98, and the engine 230 directly drives the propulsion unit 84. The controller 23 typically operates the ETM 210 in the OFF mode when the watercraft 10 is not being used or when the main battery 238 is sufficiently charged.

The controller 23 is operatively connected to (a) the batteries 238, 240 to sense their charge states, (b) the engine 230 to measure its rotational speed, (c) the ETM 210 to determine its rotational speed, (d) the speed sensor 106 to determine the speed of the watercraft 10, (e) the shore button 81 (if present) to determine if the shore button 81 is on, and (f) the throttle lever 76 to determine the desired engine 230 speed. Based on these measurements (or inputs), the controller 23 controls the throttle/operation of the engine 230, the operational mode of the ETM 210. (i.e., MOTOR (at various power outputs), GENERATOR, or OFF), the engagement state of the clutch 222 (i.e. engaged or disengaged), and the connection between the main and auxiliary batteries 238, 240 (i.e., for selectively charging the auxiliary battery 240). The controller 23 employs various control algorithms to operate the power plant 22 and the battery source 25. Of course, the controller 23 could be formed as a series of separate control systems or circuits.

In operation, if the power level of the auxiliary battery 240 falls below a predetermined minimum charge level, the main battery 238 is electrically connected to the auxiliary battery 240 via the DC/DC converter 242 to charge the auxiliary battery 240. When the auxiliary battery 240 is fully charged, the main battery 238 ceases to charge the auxiliary battery 240. If desired, the controller 23 could electrically disconnect the batteries 238, 240 from each other when the charge level of the auxiliary battery 240 reaches a predetermined maximum desired charge level.

The control functions according to one operating scheme of this invention, as embodied in the controller 23, are illustrated as a flowchart in FIG. 5A. First, the control process is INITIALIZED at step S1. The control process then progresses to step S2.

At step S2, the controller 23 places the ETM 210 into the MOTOR mode and progresses to step S3.

At step S3, the controller 23 determines whether the main battery 238 has a charge level above a predetermined minimum desired charge. If YES, the control process progresses to step S13. If NO, the control process progresses to step S4.

At step S4, the controller determines whether the clutch 222 is engaged. If the clutch 222 is not engaged, the control process progresses to step S5. If the clutch 222 is engaged, the control process progresses to step S7.

At step S5, the controller 23 places the ETM 210 into MOTOR mode, and drives the ETM 210 at a fast enough speed to rotate the crankshaft 228 of the engine 230 at a predetermined desired minimum engine 230 speed to start the engine 230 (if sufficient charge remains in the main battery 238). The desired minimum engine 230 speed preferably corresponds to the idle speed of the engine 230, as is discussed in the "Siemens starter/generator for 2002" article. The control process then progresses to step S6.

At step S6, the controller 23 engages the clutch 222 and progresses to step S7.

At step S7, the controller 23 runs/turns on the engine 230 and progresses to step S8. Because the ETM 210 drives the engine 230 at its desired minimum engine 230 speed, which is preferably the idle speed of the engine 230, before running the engine 230, the pollution caused by starting the engine 230 below the desired minimum engine speed is avoided.

At step S8, the controller 23 determines whether the engine 230 speed is at or above the desired minimum engine 230 speed. If NO, the controller 23 increases the throttle of the engine 230 and returns to step S8. If YES, the control process progresses to step S9.

At step S9, the controller 23 determines whether the charge level of the main battery 238 is at or above the predetermined maximum desired charge level. If YES, the control process progresses to step S12. If NO, the control process progresses to step S10.

At step S10, the controller 23 operates the ETM 210 in the GENERATOR mode (if the ETM 210 is not already in the GENERATOR mode), and progresses to step S11.

At step S12, the controller 23 operates the ETM 210 in the OFF mode and progresses to step S111.

At step S11, the controller 23 drives the propulsion system 84 the engine 230 by setting the throttle of the engine 230 at a position that proportionally corresponds to the throttle lever 76 position. The control process then returns to step S3. While not illustrated in the flowchart, if the shore button 81 is present and on, the controller 23 governs the engine 230 speed so as to limit the speed of the watercraft 10 to a low speed range that is discussed in greater detail below.

If the main battery 238 is above a predetermined minimum charge at step S3 (YES), the control process progresses to step S13. At step S13, the controller 23 determines whether the shore button 81 is on. If YES, the control process progresses to step S15. If NO, the control process progresses to step S14.

At step S14, the controller 23 determines whether the desired watercraft 10 speed (as measured by the throttle lever 76 position) is above the low speed range. If YES, the control process progresses to step S4 and follows the sequence described above. If NO, the control process progresses to step S15.

The shore button 81 limits the watercraft 10 to a low speed range. The low speed range preferably represents a throttle lever 76 position range that corresponds to a power output of the propulsion system 84 that can be generated exclusively by the ETM 210 and main battery 238 without the aid of the engine 230. The low throttle lever 76 position includes the zero throttle lever 76 position (i.e., the throttle lever 76 is not actuated). The low range preferably includes desired watercraft 10 speeds at and below 20 km/hr, but may alternatively include other speed ranges.

At step S15, the controller 23 operates the ETM 210 in MOTOR mode and progresses to step S16.

At step S16, the controller 23 determines whether the engine 230 is running. If YES, the control process progresses to step S17. If NO, the control process progresses to step S18.

At step S17, the controller 23 turns off the engine 230, disengages the clutch 222, and then progresses to step S18.

At step S18, the controller 23 drives the propulsion system 84 using the ETM 210 in MOTOR mode by outputting electrical power from the main battery 238 to the ETM 210 in proportion to the throttle lever 76 position. If the ETM 210 is capable of propelling the watercraft 10 faster than the maximum desired shore button 81 speed 6f the watercraft 10 (for example, 20 km/hr), this step also includes a governing algorithm that prevents the watercraft 10 from exceeding the maximum desired shore button 81 speed. Such a governing system may be based on either the actual watercraft 10 speed (as measured by the speed sensor 106) or an approximated watercraft 10 speed (as measured by the rotational speed of the ETM 210 or propulsion system 84). According to either speed measuring system, if the controller 23 senses that the watercraft 10 speed is higher than the desired maximum shore button 81 speed, the controller 23 automatically reduces the electric power output to the ETM 210 from the main battery 238. The control process then progresses to step S3. The maximum desired shore button 81 speed may be the same as or different from the upper end of the low speed range.

As would be appreciated by one or ordinary skill in the art, the above-described control process is designed such that once the charging cycle for the main battery 238 starts as a result of the charge level falling below the minimum desired charge level, the charging cycle continues until the charge of the main battery 238 reaches the maximum desired charge level. Consequently, the controller 23 will not rapidly switch the ETM 210 back and forth between the GENERATOR and MOTOR modes as the charge level for the main battery 238 flips back and forth above and below the minimum desired charge level.

Figure 8A:
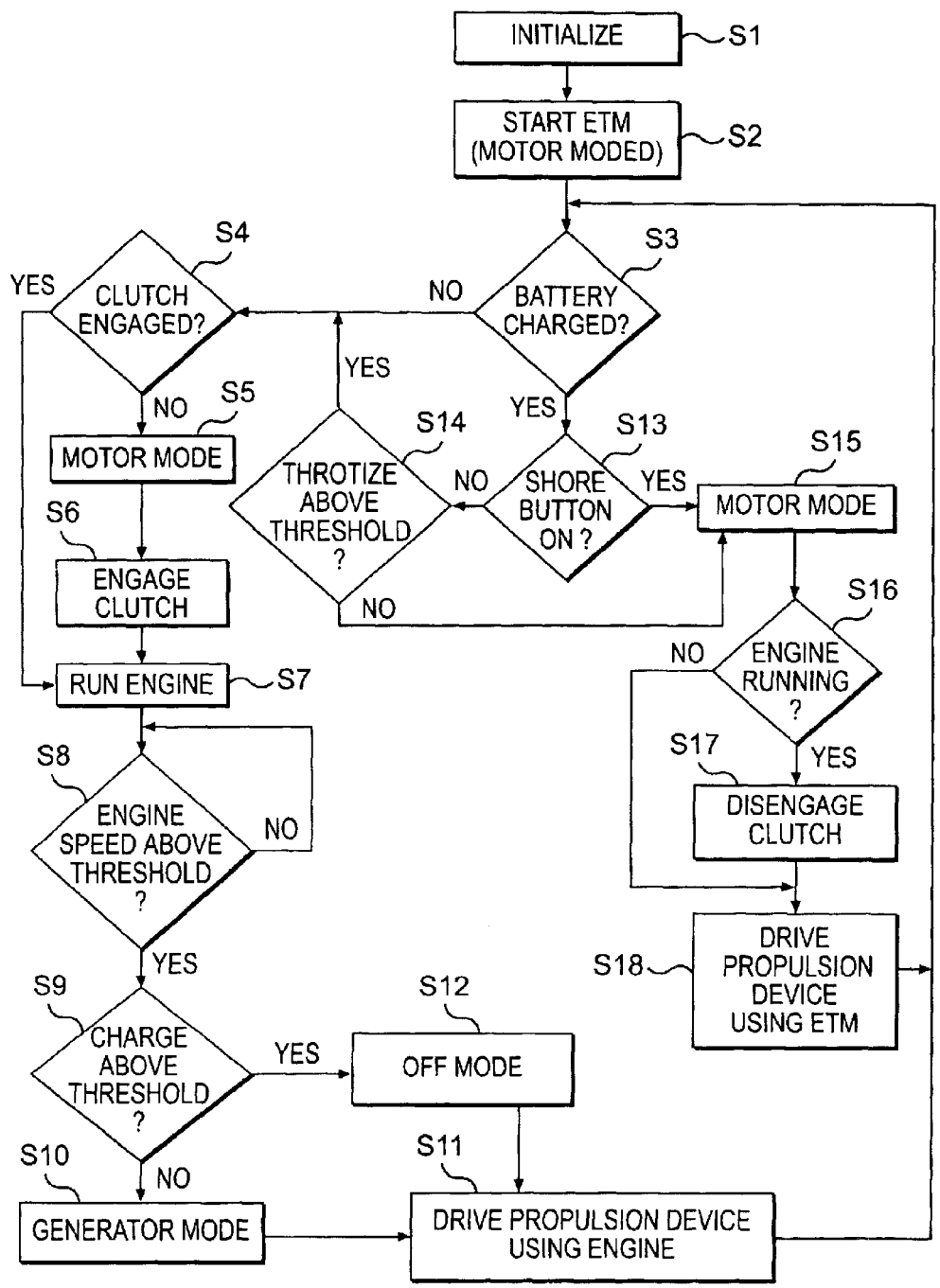
FIG. 8A is a flowchart of the operation of the controller illustrated in FIG. 7.

It should be noted that various portions of the control process in FIG. 8A may be altered without deviating from the scope of the present invention. For example, the shore button 81 may be eliminated. Consequently, if the controller 23 determines in step S3 that the main battery 238 has a charge level above the desired minimum charge level, the control process will progress directly to step S14, thereby eliminating the effect of the shore button 81 on the operation of the controller 23.

Additionally, the control process of FIG. 8A may be altered to include an additional algorithm that selectively simultaneously uses both the ETM 210 and the engine 230 to propel the watercraft 10 in a boost-mode. Such a control process may be set up in the manner described in the "Siemens starter/generator for 2002" article. For: example, when the controller 23 senses that the vehicle 10 speed (as measured by the speed sensor 106 or the output shaft 214 speed) is significantly lower than the desired speed (as measured by the throttling position of the throttle lever 76), both the ETM 210 and the engine 230 would be operated in their powering modes to add short or sustained bursts of increased combined horsepower to the propulsion system 84. After the watercraft 10 speed approaches the rider's desired speed, the controller 23 would position the ETM 210 into the OFF mode (or GENERATOR mode if the charge of the main battery 238 is low).

Figure 8B:
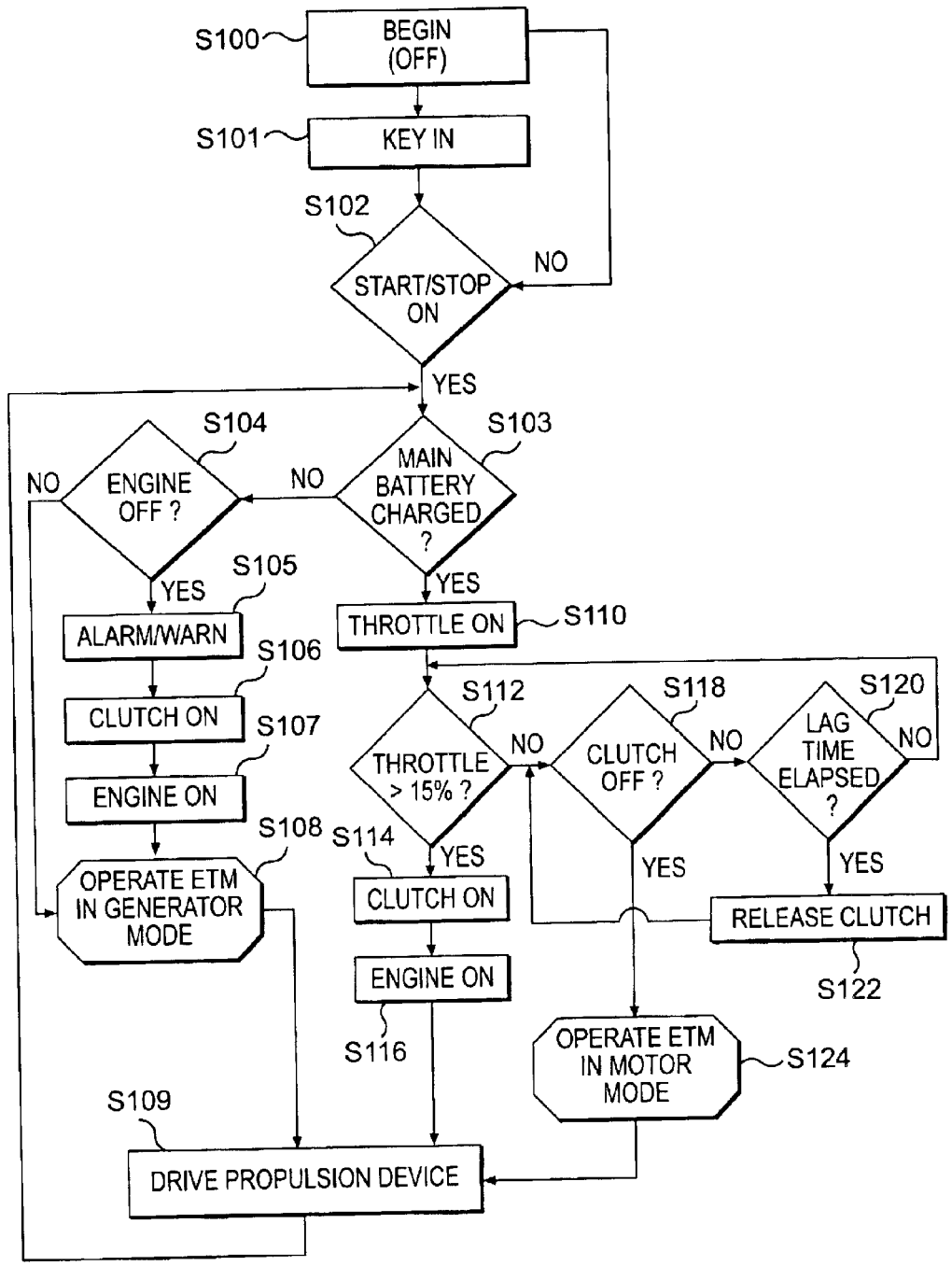
FIG. 8B is a flowchart of another operating scheme of the controller.

A preferred operating scheme for the controller 23 in accordance with this invention is represented in the flow chart of FIG. 8B. The control process begins with the power source OFF at step 100 (S100). Then, an operator begins the starting process for the vehicle by placing the key or other starting mechanism in the key hole or slot, as is known, at step 101 (S101). It is then determined whether the START/STOP button or switch is pressed ON at step 102 (S102). If the button is not ON, the vehicle will not start, and the process returns to the initial step S100.

Once the START/STOP button is ON, the process assesses the charge condition of the main battery 238 at step 103 (S103). If the main battery 238 is not charged (NO), it is determined whether the engine 230 is off at step 104 (S104). If YES, an alarm or some type of warning is generated at step 105 (S105) that signals that the main battery 238 is low and the engine 230 will be started. The alarm can be any known type of warning, including but not limited to an audible alarm such as a beep, a visual alarm such as a flashing light or message, or a combination of the two. Preferably, the warning lasts about 5–10 seconds, but of course can be varied based on the manufacturer's preference. It is also possible to eliminate the warning step if desired. Next, the clutch engages (ON) at step 106 (S106), and the engine 230 is turned ON at step 107 (S107). With the engine 230 running, the ETM 210 is operated in the GENERATOR MODE at step 108 (S108) and the propulsion device 84 is driven at step 109 (S109). If the engine 230 is already ON at S104 (NO), the process proceeds directly to S108 to operate the ETM 210 in GENERATOR MODE and drive the propulsion system 84 at S109.

Referring back to S103, when the main battery 238 is charged above a predetermined threshold (YES), the process proceeds to step 110 (S110) to turn the throttle on. Next, it is determined whether the throttle is opened more than 15% at step 112 (S112). This value can, of course, be set differently by the manufacturer. The value can also have a range (plus or minus 2% for example) such that when the throttle is operated in the 15% range, the power plant 22 does not constantly change of operating mode. This could also be done by sensing the rate at which the throttle changes. The idea is to set a threshold engine speed below which the vehicle can be operated by driving the propulsion system 84 using the ETM 210.

When the throttle is open more than 15%, the clutch is engaged at step 114 (S114). Then the engine 230 is turned on at step 116 (S116) to drive the propulsion system 84 at S109.

When the throttle is open 15% or less, the process proceeds to step 118 (S118) to determine whether the clutch is off. If NO, it is determined whether a predetermined lag time has elapsed at step 120 (S120), and if the lag time has not elapsed the process goes back to S112. If the lag time has elapsed (YES), the clutch is released at step 122 (S122) and the process returns to S118. The lag time can be set at the engine manufacturer's discretion. With the clutch off (S118), the ETM 210 is operated in the MOTOR MODE at step 124 (S124), and the propulsion system 84 is driven at S109.

It is noted that while the propulsion system 84 is driven (S109) by either power source, the process executes an endless loop to determine the charge status of the main battery 238.

Figure 9:
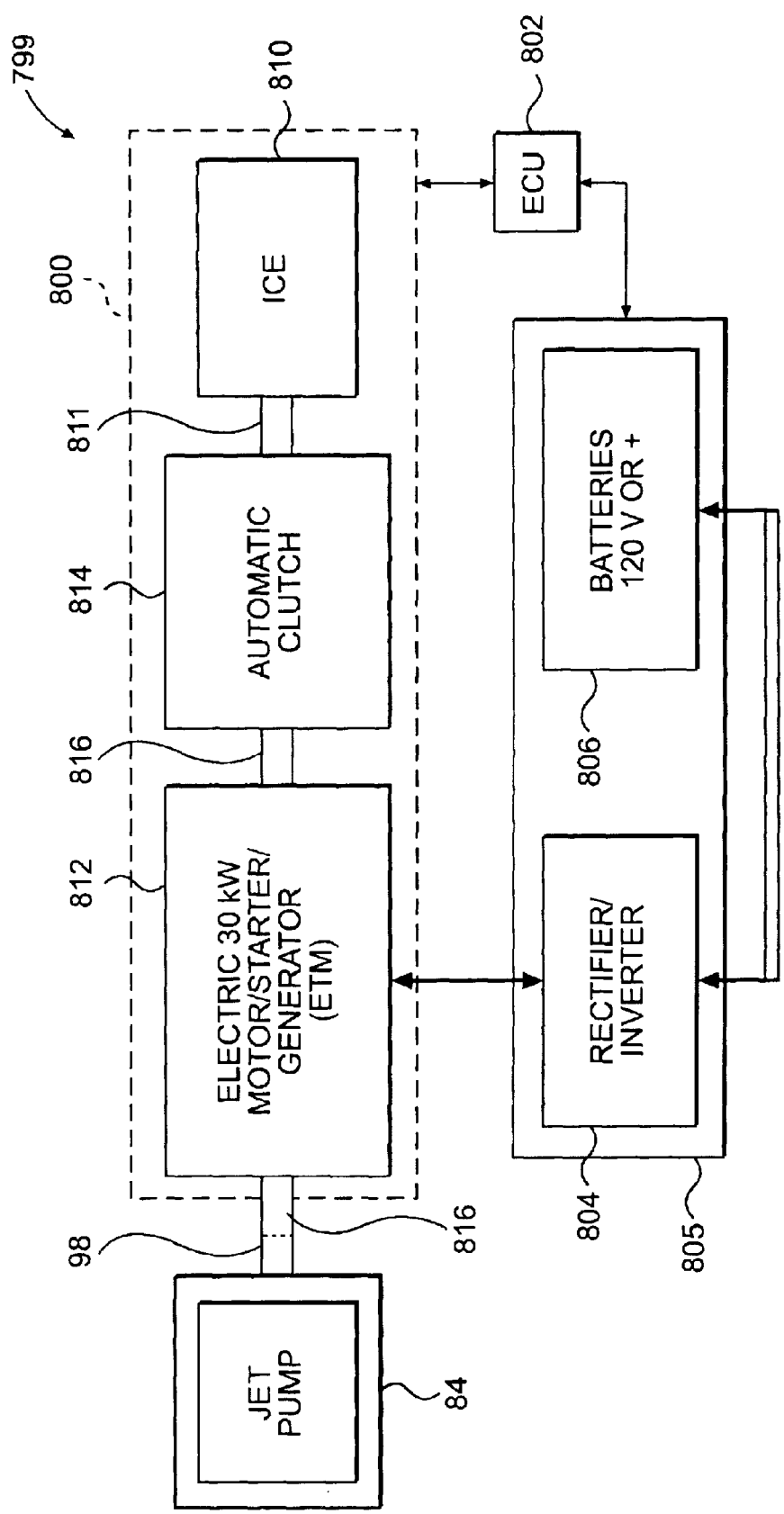
FIG. 9 is a block diagram showing an alternate hybrid power system in accordance with an alternate preferred embodiment of the invention.

FIG. 9 is a block diagram of an alternate hybrid power system 799, which is the preferred embodiment of the present invention, which is generally similar to the previous embodiment except that the power plant 22, controller 23, battery source 25, and DC/DC converter 242 are replaced with a power plant 800, controller 802, rectifier/inverter 804, and battery source 806. The power plant 800 includes an engine 810, preferably an internal combustion engine (ICE) and an ETM 812, preferably an integrated starter/generator AC electric motor that can generate a 30 kW output. The engine 810 includes a crankshaft 811 coupled to an output shaft 816 of the ETM 812 via a clutch 814. The output shaft 816 of the ETM 812 is coupled to the shaft 98 of the propulsion system 84. As in the previous embodiment, the power plant 800 can have various arrangements of output shafts to connect to the drive shaft 98.

The clutch 814 of the present embodiment differs from the controlled clutch 222 of the previous embodiment in that the clutch 814 is an automatic centrifugally-actuated clutch 814, as is known in the art. The centrifugal sensor of the clutch 814 is operatively connected to the output shaft 816 of the ETM 812. The centrifugal sensor may be integrally formed with the clutch 814, as in conventional, mechanical, flywheel-based, centrifugal clutches. Alternatively, the centrifugal sensor may be distinct from the clutch 814 (e.g., a separate rotational speed sensor that measures output shaft 816 speed instead of directly measuring centrifugal force). The centrifugal sensor is calibrated to engage the clutch 814 (i.e., couple the crankshaft 811 of the engine 810 to the output shaft 816 of the ETM 812) when the output shaft 816 speed of the ETM 812 exceeds a predetermined speed. The predetermined speed is preferably set slightly lower than a maximum output speed of the ETM 812. Consequently, whenever the ETM 812 output approaches its maximum power, the clutch 814 engages. The controller 802 senses the clutch 814 and is designed to automatically turn on the engine 810 to provide additional power to the shaft 98 when the clutch 814 engages.

The battery source 805 includes a plurality of batteries 806 and a power converter 804, preferably in the form of a rectifier/inverter. The batteries 806 are preferably 120 V or more DC batteries that power both the ETM 812 and any other electric systems in the watercraft 10. The controller 802 selectively electrically connects the ETM 812 to the DC batteries 806 via the rectifier 804. The rectifier 804 converts the alternating current from the ETM 812 to direct current for the batteries 806 and vice versa. Preferably, the rectifier 804 is an inverter that uses, for example, a power transistor or thyristor.

One aspect of this embodiment is that if the battery 806 has an insufficient charge to drive the ETM 812 fast enough to engage the clutch 814, the engine 810 cannot engage the shaft 98 or the ETM 812. It is therefore important that the watercraft operator monitor the battery 806 charge level to ensure that the charge does not drop below a minimum charge level required to accelerate the output shaft 816 to the clutch 814 engagement speed. To address this situation, the controller 802 can be programmed to automatically increase the output of the ETM 812 when the battery 806 charge falls to near the minimum charge level. The increased power output to the ETM 812 accelerates the ETM 812 and engages the clutch 814. Thereafter, the controller 802 may switch the ETM 812 to the GENERATOR mode and control the engine 810 throttle to ensure that the engine crankshaft 811 speed stays above the clutch 814 disengagement speed until the battery 806 has been sufficiently recharged. Thereafter, the controller 802 may switch the ETM 812 to the OFF mode or again use the ETM 812 in the MOTOR mode.

Alternatively, the centrifugal clutch 814 may include a manual override that enables the watercraft operator to manually engage the clutch 814 if the battery 806 charge falls below the level required to engage the clutch 814. In such an embodiment, it is still preferred that the watercraft operator ensures that the battery 806 charge level does not fall below a level required to start the engine 810. Fortunately, the charge level required to start the engine 810 is significantly lower than the charge level required to centrifugally engage the clutch 814. As a result, if the ETM 812 is unable to engage the clutch 814 because the charge level of the battery 806 is below the clutch 814 engagement charge level, the watercraft operator will be warned that the battery 806 charge is low. The charge level of the battery 806 will nonetheless be high enough to start the engine 810 after the operator manually engages the clutch 814.

Alternatively, an additional starter battery (not shown) may be dedicated to providing sufficient power to start the engine 810 using the ETM 812 when the battery 806 is discharged. Such a dedicated battery may be automatically charged by the battery 806. However, because the dedicated starter battery does not operate any other watercraft components and will not discharge if the battery 806 discharges, the dedicated starter battery ensures that enough power can be provided to the ETM 812 to engage the clutch 814 and start the engine 810.

The control process for the controller 802 is quite similar to that of the controller 23 illustrated in FIG. 8A, with the following noted exceptions. In step S5, when the controller 802 operates the ETM 812 in MOTOR mode, the controller 802 drives the ETM 812 fast enough to engage the clutch 814, thereby satisfying step S6. In step S8, the engine speed threshold must, be set high enough that the clutch 814 remains engaged if the ETM 812 is switched into GENERATOR mode. The clutch 814 engagement/disengagement speed is therefore preferably slightly less than the idle speed of the engine 810. At step S17, when the controller 802 turns off the engine 810, the output shaft 816 speed drops sufficiently to disengage the clutch 814. To ensure the disengagement, the controller 802 governs the ETM 812 power to ensure that the ETM 812 speed stays below the clutch 814 engagement speed. In step S18, the controller 802 continues to govern the ETM 812 power to prevent the clutch 814 from engaging.

Figure 10:
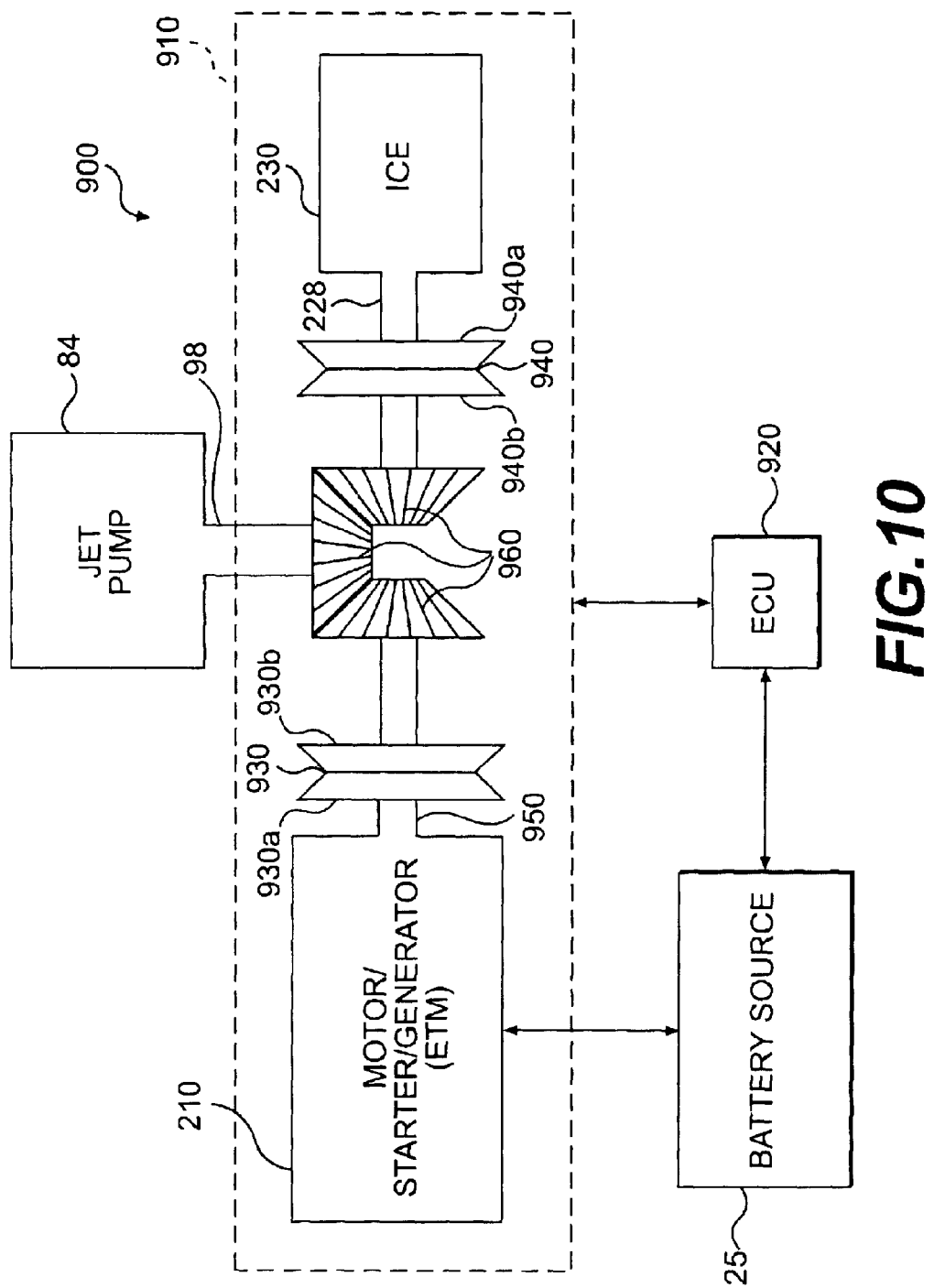
FIG. 10 is a block diagram showing an additional alternate power system in accordance with an additional alternate preferred embodiment of the invention.

FIG. 10 schematically illustrates a hybrid power system 900 according to an additional embodiment of the present invention. The power system 900 is similar to and may replace the power system 200 described above. The power system 900 includes the jet pump 84, a power plant 910, the battery source 25, and a controller 920. The controller 920 controls the power plant 910, which is operatively connected to the jet pump 84. Unlike the previously described hybrid power systems 200, 799, the power system 900 can power the jet pump 84 using the engine 230 without having to simultaneously rotate the ETM 210. The power system 900 therefore avoids the friction/resistance associated with forcefully rotating the ETM. 210 when the ETM is in the OFF mode.

As in the previously described power plant 22, the power plant 910 includes the engine 230 and ETM 210, although alternative engines and motors may be used with the power plant 910 without departing from the scope of the present invention. The power plant 910 differs from the power plant 22 in that the ETM 210 and engine 230 of the power plant 910 are independently selectively operatively connected to the jet pump 84 via a motor clutch 930 and an engine clutch 940, respectively.

The motor clutch 930 includes selectively rotationally disengagable ETM and jet pump sides 930a, 930b. The ETM side 930a is rotationally connected to an output shaft 950 of the ETM 210. The jet pump side 930b is rotationally connected to a drive/impeller/input shaft 98 of the jet pump 84.

The engine clutch 940 includes selectively rotationally disengagable engine and jet pump sides 940a, 940b. The engine side 940a is rotationally connected to the crankshaft 228 of the engine 230. The jet pump side 940b is rotationally connected to the drive/impeller/input shaft 98 of the jet pump 84.

The schematically illustrated rotational connection between the jet pump sides 930b, 940b of the clutches 930, 940 and the shaft 98 comprises three meshing bevel gears 960, which cause the ETM output shaft 950 and engine crankshaft 228 to form an angle with the jet pump shaft 98. The bevel gears 960 could alternatively be replaced with a variety of other conventional rotational links without departing from the scope of the present: invention. For example, the connection could comprise straight gears such that all three shafts 229, 950, 98 would be parallel.

The controller 920 preferably comprises an ECU that functions in much the same way as the controller 23. The controller 920 engages and disengages the engine clutch 940 whenever the controller 23 would have engaged or disengaged the clutch 222. The controller 920 engages the motor clutch 930 whenever the controller 920 operates the ETM 210 in the MOTOR or GENERATOR modes and disengages the motor clutch 930 whenever the controller 920 operates the ETM 210 in the OFF mode. Consequently, when the ETM 210 is not being used to rotate the engine 230 and jet pump 84 or charge the battery source 25, the ETM is rotationally disconnected from the remainder of the power plant 910 so that the engine 230 does not have to continually rotate the ETM 210 when the ETM 210 is not needed.

The hybrid power system 900 could also be modified by eliminating the motor clutch 930 such that the modified power system would work in the same way as the hybrid power system 200.

Figure 11:
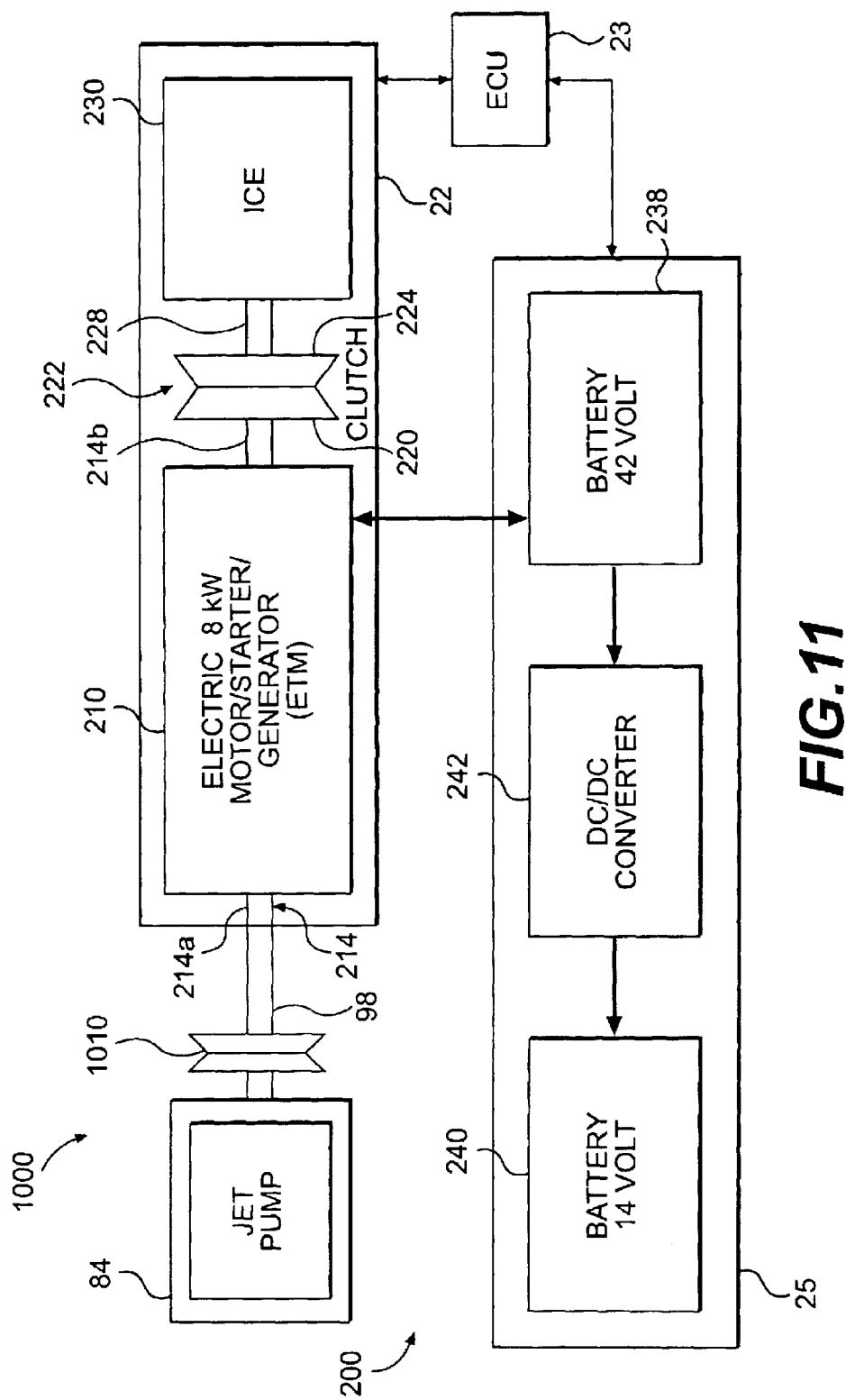
FIG. 11 is a block diagram showing a further alternate power system in accordance with a further alternate preferred embodiment of the invention.

FIG. 11 schematically illustrates a hybrid power system 1000 according to an additional alternative embodiment of the present invention. The power system 1000 is similar to the power system 200 previously described. Although not shown, the power system 1000 also includes a power converter similar to the one shown in power system 200. Accordingly, a redundant description of the similar and/or identical components is not provided. The power system 1000 includes a jet pump clutch 1010 disposed on the shaft 98 of the jet pump 84 between the jet pump 84 and the power plant 22. The clutch 1010 enables the engine 230 and/or ETM 210 to rotate without rotating the impeller of the jet propulsion unit 84 of the watercraft 10. The clutch 1010 preferably disengages when the engine 230 and/or ETM 210 idles (rotates at relatively low speeds associated with a totally released throttle lever 76) and engages when the engine 230 and/or ETM 210 rotates at higher speeds (i.e., when the throttle lever 76 is depressed).

The clutch 1010 may be centrifugally controlled. For example, the clutch 1010 may be a fly-wheel based centrifugal clutch that engages when the rotational speed of the power plant 22 side of the clutch 1010 exceeds a predetermined minimum value. Alternatively, the clutch 1010 may be controlled by a controller. (that may or may not be integrated into the controller 23) such that the clutch 1010 engages when the sensed rotational speed of the engine 230 and/or ETM 210 exceeds a predetermined speed. Alternatively, the clutch 1010 may be operatively controlled by the throttle lever 76 (or other operator-controlled throttle device such as a throttle foot pedal or a handlebar grip based throttle) such that the clutch 1010, engages whenever the lever 76 is depressed/actuated, which indicates that the operator desires to propel the watercraft 10, and disengages whenever the lever 76 is released.

The clutch 1010 may comprise any of a variety of conventionally known clutches that one of ordinary skill in the art would appreciate as being appropriate for use with the power system 1000.

The clutch 1010 may also disengage whenever the ETM 210 is used to start the engine 230 so as to minimize the power that the ETM 210 must provide to start the engine 230 by eliminating the need for the ETM 210 to simultaneously rotate the impeller of the jet propulsion unit 84.

Figure 12A:
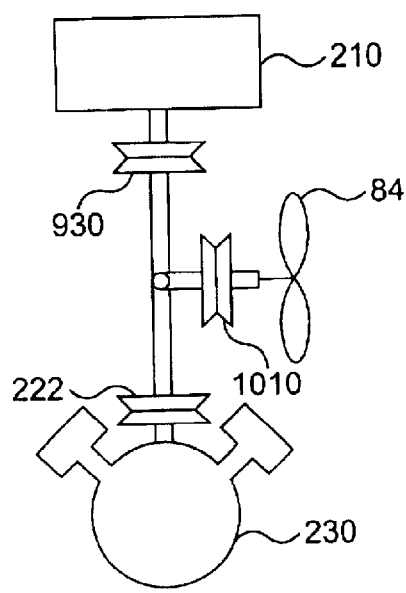
FIGS. 12A–12E illustrate schematic diagrams of additional alternate power systems in accordance with the invention.
Figure 12B:
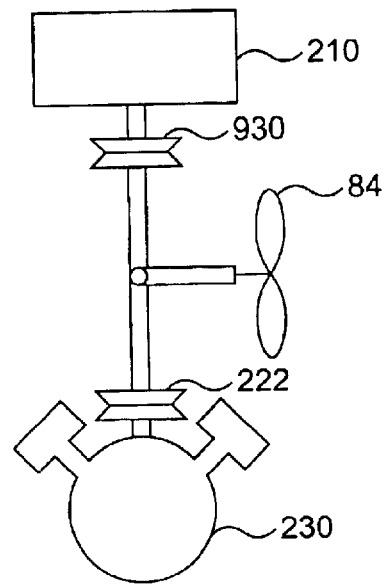
Figure 12C:
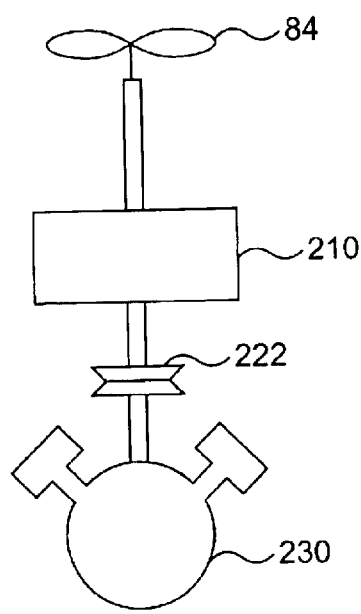
Figure 12D:
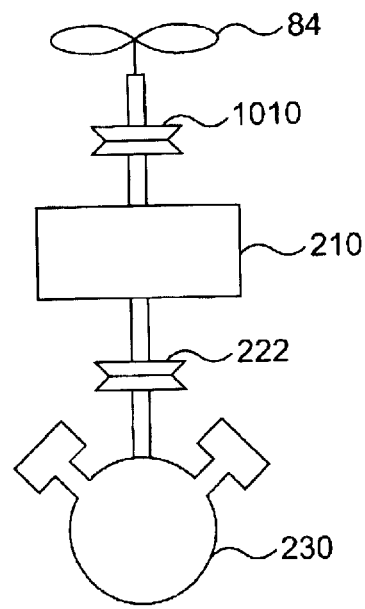

The clutch 1010 may also be added to the hybrid power system 900 such that three clutches (a motor clutch 930, and engine clutch 940, and a jet propulsion unit clutch 1010) are provided. Furthermore, any one of the three clutches could be omitted entirely. FIGS. 12A–12D illustrate several of the clutch combinations that fall within the scope of the present invention. Although the reference numerals are used from the first embodiment for purposes of explanation, these configurations could be applied to any of the embodiments disclosed herein. FIG. 12A shows an engine 230 having a clutch 222 coupled to the ETM 210 having a clutch 930 and a jet propulsion system 84 with a clutch 1010. FIG. 12B shows a similar arrangement without the use of the jet propulsion clutch 1010. FIG. 12C shows an assembly in which a clutch 222 is disposed between the engine 230 and the ETM 210, while FIG. 12D shows an additional clutch 1010 disposed between the ETM 210 and the jet propulsion system 84. These schematic views are intended to show the flexibility of this concept.

Figure 12E:
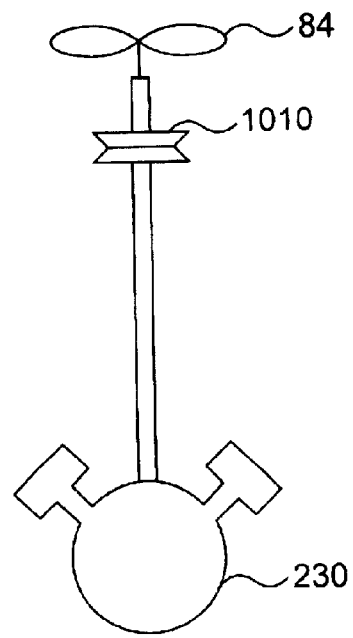

Furthermore, while the illustrated clutch 1010 is embodied in a hybrid power system 1000 that utilizes a hybrid power plant 22, the clutch 1010 may alternatively be used with a conventional jet-propelled watercraft having an engine-powered (non-hybrid) power plant without departing from the scope of the present invention. FIG. 12E shows such an arrangement in which the engine 230 is coupled to the propulsion system 84 with a clutch 1010 therebetween. Furthermore, the clutch 1010 may be used with any other jet propulsion system power plant (e.g., electric motor only, etc.) as well.

While each of the above-described embodiments includes at least one clutch, the present invention may be practiced without using a clutch. In such an embodiment, when the controller selectively chooses to drive the propulsion system using only the ETM, the ETM drives both the propulsion system and the crankshaft of the engine. When the controller selectively chooses to drive the propulsion system using only the engine (and/or charge the battery), the engine drives both the propulsion system and the ETM. When the controller selectively chooses to drive the propulsion system using both the ETM and the engine, both the ETM and the engine both drive the propulsion system.

Figure 13:
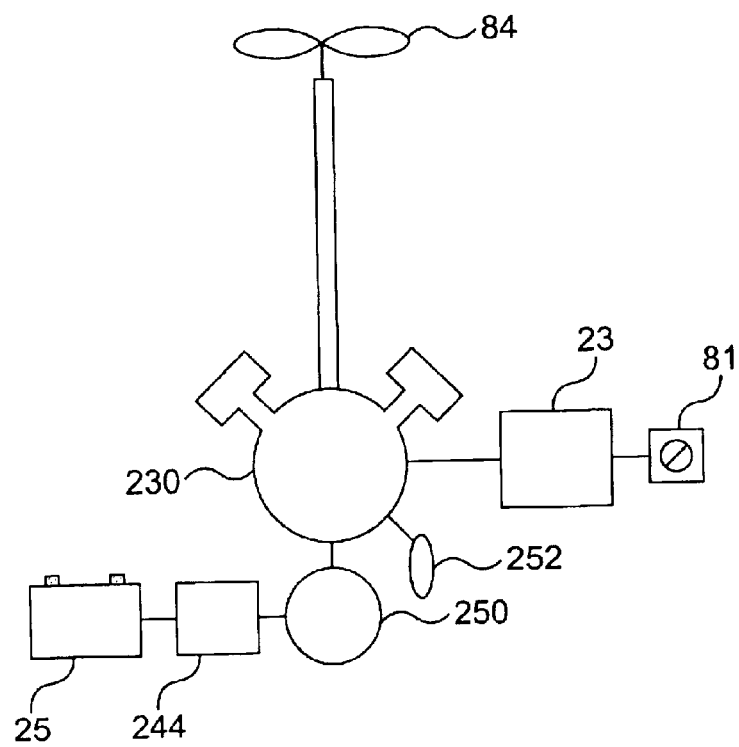
FIG. 13 is a schematic diagram of a power system in accordance with another embodiment of the invention illustrating a shore button.

FIG. 13 shows an arrangement without a clutch in a basic power assembly but with use of a shore button 81 in accordance with this invention, as discussed in detail above. In this case, the engine 230 is coupled to the jet propulsion system 84 and has a separate AC generator 250 and starter motor 252, rather than a hybrid system. The AC generator 250 is coupled to the battery 25 through a rectifier 244. The shore button 81 is connected to the ECU 23 which receives signals from the shore button 81, as described above, to control operation of the engine 230.

In any of the embodiments disclosed herein, it is possible to use an additional starter motor 252, which can be used to charge the battery 25 without running the propulsion system.

Figure 14:
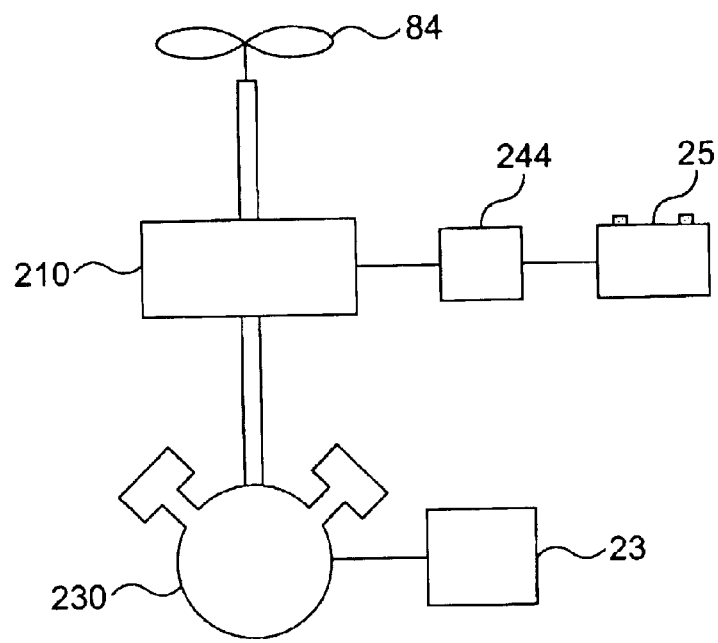
FIG. 14 is a schematic diagram of a power system in accordance with the invention showing the assembly without use of a clutch.
Figure 15:
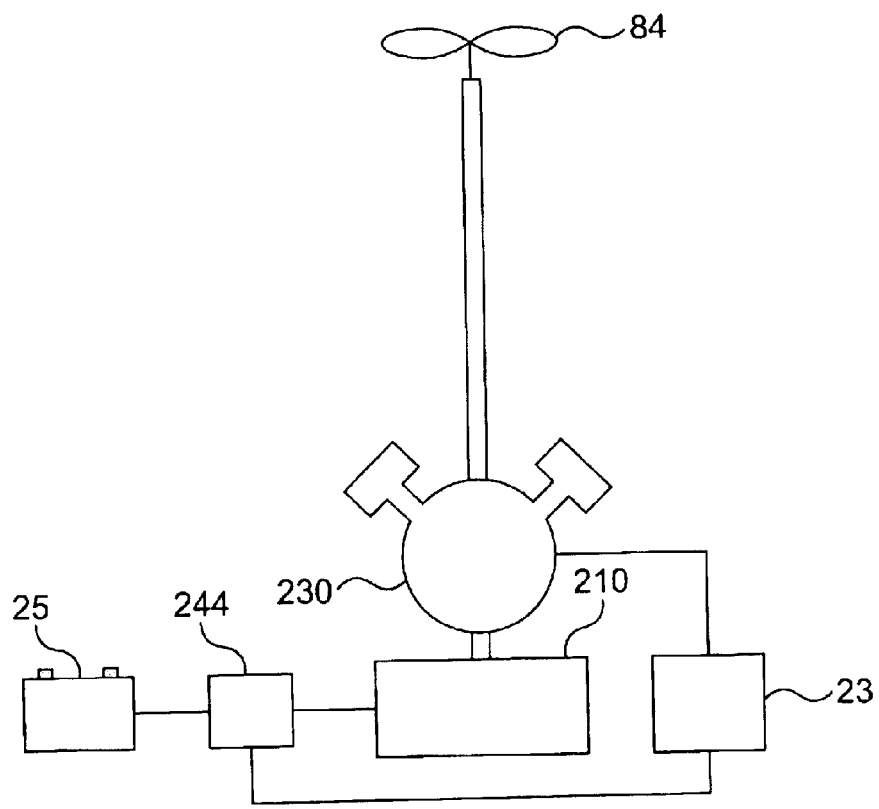
FIG. 15 is a schematic diagram of a power system in accordance with another arrangement of the invention without use of a clutch.

FIG. 14 also illustrates an assembly without a clutch in which the engine 230 is connected to the propulsion system 84 through the ETM 210. The ECU 23 is coupled to the engine 230, and the battery 25 and rectifier 244 are connected to the ETM 210. FIG. 15 shows a similar arrangement except that the engine 230 is connected between the propulsion device 84 and the ETM 210. In these cases, the ETM 210 is strong enough to turn the engine 230 and propulsion system 84 even though the engine 230 is not sparking.

Further, the propulsion system of such craft need not be a jet propulsion system but could be a regular propeller system. In such a watercraft, the shaft 98 would be mounted to an inboard or outboard propeller instead of the jet propulsion system 84.

Additionally, as noted previously, this invention is not limited to PWCs. For example, the hybrid power systems 200, 799, 900, 1000 disclosed herein may also be useful in small boats or other floatation devices other than those defined as personal watercrafts.

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. A watercraft comprising:
   a hull having port and starboard sides and a stern;
   a propulsion system supported by the hull including a drive shaft, wherein the propulsion system propels the watercraft when the drive shaft is driven;
   a power plant supported by the hull, wherein the power plant comprises;
   an electrical turning machine (ETM) having an output shaft operatively connected to the drive shaft, wherein the ETM is capable of operating in a generator mode and a motor mode; and
   an internal combustion engine having a crankshaft operatively connected to the drive shaft and the ETM;
   a battery operatively connected to the ETM;
   a controller connected to the power plant that controls driving of the drive shaft by the power plant; and
   an operator-controlled throttle lever, wherein the controller is operatively connected to the throttle lever to sense a position of the throttle lever wherein, when (a) the throttle lever position is in a predetermined throttle lever range and (b) the charge level of the batter is above a predetermined minimum charge level, the controller turns off the engine, and operates the ETM in motor mode at a power level corresponding to the throttle lever position.

2. The watercraft of claim 1, wherein the ETM is disposed between the propulsion system and the internal combustion engine.

3. The watercraft of claim 2, further comprising a clutch disposed between the internal combustion engine and the propulsion system.

4. The watercraft of claim 3, wherein the controller is operatively coupled to the clutch and activates the clutch to selectively disengage the internal combustion engine.

5. The watercraft of claim 3, wherein the clutch is a centrifugal clutch.

6. The watercraft of claim 3, wherein the clutch is disposed between the ETM and the internal combustion engine and further comprising a second clutch disposed between the ETM and the propulsion system.

7. The watercraft of claim 1, wherein the internal combustion engine is disposed between the propulsion system and the ETM.

8. The watercraft of claim 1, wherein the ETM comprises an integrated starter/generator.

9. The watercraft of claim 1, wherein the battery is a main DC battery.

10. The watercraft of claim 9, further comprising an auxiliary DC battery having a different voltage than the main DC battery, and a DC/DC converter electrically connecting the main DC battery to the auxiliary DC battery.

11. The watercraft of claim 1, wherein the controller operatively connects the battery to the EIM to selectively operate the ETM in the generator mode, the motor mode or an off mode.

12. The watercraft of claim 1, further comprising an operator-actuated shore button operatively connected to the controller provide a signal to the controller of the operator's desire as to the mode of operation of the ETM to select the mode of operation of the ETM applied to the propulsion system by the power plant.

13. The watercraft of claim 1, wherein the propulsion system is a jet propulsion system.

14. The watercraft of claim 1, further comprising a straddle seat for an operator supported by the hull.

15. A watercraft comprising:
   a hull having port and starboard sides and a stern;
   a propulsion system having a drive shaft supported by the hull;
   a power plant having an output shaft operatively connected to the propulsion system;
   an operator-actuated switch having first and second operational modes; and
   a controller operationally connected to the power plant to control the speed of the drive shaft and operatively connected to the switch to sense the operational mode of the switch;
   wherein the controller prevents the drive shaft from rotating faster than a predetermined speed when the switch is in its first operational mode and allows the drive shaft to rotate faster than the predetermined speed when the switch is in the second operational mode.

16. The watercraft or claim 15, wherein the power plant comprises an electrical turning machine (ETM) and an internal combustion engine, and the watercraft includes a battery connected to the ETM,
   wherein the ETM operates in a motor mode to drive the propulsion system and a generator mode to charge the battery and the controller selectively actuates the ETM end the internal combustion engine to drive the propulsion system.

17. A method of operating a watercraft, the watercraft comprising a hull having port and starboard sides and a stern, a propulsion system supported by the hull to propel the watercraft an electrical turning machine (ETM) having an output shaft operatively connected to a drive shaft of the propulsion system, an internal combustion engine having a crankshaft operatively connected to the drive shaft, and a battery operatively connected to the ETM, the method comprising:

determining a charge level of the battery;

when the battery is determined to be below a predetermined charge level, causing the engine to drive the propulsion system and operate the ETM in a generator mode to charge the battery; and when the battery is determined to have a predetermined charge level, selecting between causing the engine to drive the propulsion system and operating the ETM in a motor mode to drive the propulsion system.

18. The method of claim 17, wherein the watercraft further comprises at least one clutch coupled between the ETM and the engine, the method further comprising engaging the clutch and causing the engine to operate the ETM in the generator mode.

19. The method of claim 17, wherein the watercraft further comprises at least one clutch coupled between the ETM and the engine, the method further comprising disengaging the clutch and operating the ETM in the motor mode with the engine off.

20. The method of claim 17, wherein the watercraft further comprises an operator-actuated shore button, the method further comprising:

operating the ETM in the motor mode when the shore button is on and a charge level of the batter is above a predetermined charge level.

* * * * *